United States Patent
Grady et al.

(12)

(10) Patent No.: US 9,918,039 B2
(45) Date of Patent: Mar. 13, 2018

(54) INTERFACE SYSTEMS FOR PORTABLE DIGITAL MEDIA STORAGE AND PLAYBACK DEVICES

(75) Inventors: Jeff Grady, Charleston, SC (US); Garey De Angelis, Charleston, SC (US); Andrew Green, Mount Pleasant, SC (US); Vincent K. Gustafson, Chapel Hill, NC (US)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 2559 days.

(21) Appl. No.: 11/549,602

(22) Filed: Oct. 13, 2006

(65) Prior Publication Data

US 2008/0089658 A1   Apr. 17, 2008

(51) Int. Cl.
| | |
|---|---|
| *H04N 5/765* | (2006.01) |
| *H04N 5/775* | (2006.01) |
| *H04N 5/225* | (2006.01) |
| *H04N 21/41* | (2011.01) |
| *H04N 21/436* | (2011.01) |

(Continued)

(52) U.S. Cl.
CPC ............. *H04N 5/775* (2013.01); *H04N 5/225* (2013.01); *H04N 21/4104* (2013.01); *H04N 21/4363* (2013.01); *H04N 21/43615* (2013.01); *H04N 5/765* (2013.01); *H04N 5/77* (2013.01); *H04N 5/781* (2013.01); *H04N 5/907* (2013.01); *H04N 9/8042* (2013.01)

(58) Field of Classification Search
CPC ...... H04N 5/765; B60N 2/4876; B60R 11/02; B60R 11/0211
USPC ................ 386/248, 239, 358, 359, 360, 362
See application file for complete search history.

(56) References Cited

U.S. PATENT DOCUMENTS 5,710,507 A * 1/1998 Rosenbluth ........... H02J 7/0091
                                                         219/209
5,790,201 A    8/1998 Antos
(Continued)

FOREIGN PATENT DOCUMENTS

| CN | 1765059 A | 4/2006 |
|---|---|---|
| EP | 1698518 A2 | 9/2006 |

(Continued)

OTHER PUBLICATIONS

DLO HomeDock Deluxe Review—Home Entertainment—CNET Reviews, May 15, 2006.*

(Continued)

*Primary Examiner* — Daquan Zhao

(57) ABSTRACT

A docking assembly serves as an interface between (1) a portable digital media storage and playback (PDMSP) device, and (2) a media reproduction system. A remote controller preferably controls the docking assembly and PDMSP device, which may receive electric charge from the assembly. Media reproduction systems may reproduce audio and video signals in user-perceptible form. Telephonic relay capability is further provided between a telephonic PDMSP playback device and a telephonic remote controller by way of a telephone rebroadcast receiver associated with the docking assembly. Methods for downloading digital media files, and for creating or modifying playlists with a remotely controllable docking assembly adapted to provide a television-compatible video output signal, are further provided.

55 Claims, 11 Drawing Sheets

(51) Int. Cl.
*H04N 21/4363* (2011.01)
*B60R 11/02* (2006.01)
*H04N 5/77* (2006.01)
*H04N 5/781* (2006.01)
*H04N 5/907* (2006.01)
*H04N 9/804* (2006.01)

(56) References Cited

U.S. PATENT DOCUMENTS

| | | |
|---|---|---|
| 6,175,926 B1 | 1/2001 | Fogle |
| 6,240,297 B1 | 5/2001 | Jadoul |
| 6,373,503 B1 | 4/2002 | Perkes |
| 6,423,892 B1 | 7/2002 | Ramaswamy |
| 6,545,722 B1 | 4/2003 | Schultheiss et al. |
| 6,631,098 B2 | 10/2003 | Chang et al. |
| 6,637,028 B1 | 10/2003 | Voyticky et al. |
| 6,702,604 B1 * | 3/2004 | Moscovitch ........ B60R 11/0235 248/121 |
| 6,782,239 B2 | 8/2004 | Johnson et al. |
| 6,836,643 B2 | 12/2004 | Shealtiel |
| 6,973,477 B1 | 12/2005 | Martino |
| 6,978,475 B1 | 12/2005 | Kunin et al. |
| 6,983,984 B2 | 1/2006 | Garceau |
| 7,065,778 B1 | 6/2006 | Lu |
| 7,076,202 B1 | 7/2006 | Billmaier |
| D554,107 S * | 10/2007 | Calco et al. ................. D14/217 |
| 7,346,778 B1 * | 3/2008 | Guiter et al. ................. 713/182 |
| 7,529,871 B1 | 5/2009 | Schubert et al. |
| 8,086,332 B2 * | 12/2011 | Dorogusker ............. H04R 5/04 700/94 |
| 2002/0002039 A1 | 1/2002 | Qureshey et al. |
| 2002/0032042 A1 | 3/2002 | Poplawsky et al. |
| 2002/0072390 A1 | 6/2002 | Uchiyama |
| 2002/0077834 A1 | 6/2002 | Estevez |
| 2002/0098813 A1 | 7/2002 | Likourezos et al. |
| 2002/0105861 A1 | 8/2002 | Leapman |
| 2002/0132651 A1 | 9/2002 | Jinnouchi |
| 2002/0151327 A1 | 10/2002 | Levitt |
| 2003/0041206 A1 | 2/2003 | Dickie |
| 2003/0154355 A1 | 8/2003 | Fernandez |
| 2004/0107253 A1 | 6/2004 | Ludwig et al. |
| 2004/0171346 A1 | 9/2004 | Lin |
| 2004/0193900 A1 | 9/2004 | Nair |
| 2004/0224638 A1 | 11/2004 | Fadell et al. |
| 2004/0250002 A1 | 12/2004 | Hellberg |
| 2005/0046751 A1 * | 3/2005 | Simmons ..................... 348/734 |
| 2005/0062695 A1 | 3/2005 | Cok et al. |
| 2005/0088620 A1 | 4/2005 | Dwyer et al. |
| 2005/0135790 A1 | 6/2005 | Hutten |
| 2005/0195848 A1 | 9/2005 | Braneci et al. |
| 2005/0213717 A1 | 9/2005 | O'Neil et al. |
| 2005/0227773 A1 | 10/2005 | Lu et al. |
| 2006/0031617 A1 | 2/2006 | Falcon |
| 2006/0039263 A1 | 2/2006 | Trotabas |
| 2006/0127034 A1 | 6/2006 | Brooking et al. |
| 2006/0156415 A1 | 7/2006 | Rubinstein et al. |
| 2006/0184978 A1 | 8/2006 | Casey et al. |
| 2006/0262326 A1 | 11/2006 | Abdulhalim et al. |
| 2006/0274910 A1 | 12/2006 | Schul et al. |
| 2007/0040652 A1 * | 2/2007 | Quatro ......................... 340/7.55 |
| 2007/0070183 A1 * | 3/2007 | Davis .......................... 348/14.02 |
| 2007/0077784 A1 * | 4/2007 | Kalayjian et al. .............. 439/61 |
| 2007/0086724 A1 | 4/2007 | Grady et al. |
| 2007/0101039 A1 | 5/2007 | Rutledge et al. |
| 2007/0124804 A1 | 5/2007 | Burnham et al. |
| 2007/0250571 A1 | 10/2007 | Griffin, Jr. |
| 2007/0300155 A1 | 12/2007 | Laefer et al. |
| 2008/0015717 A1 | 1/2008 | Griffin, Jr. et al. |
| 2008/0025172 A1 | 1/2008 | Holden et al. |
| 2008/0089667 A1 | 4/2008 | Grady et al. |
| 2008/0092200 A1 | 4/2008 | Grady et al. |
| 2008/0138028 A1 | 6/2008 | Grady et al. |
| 2008/0247576 A1 | 10/2008 | Marlowe |

FOREIGN PATENT DOCUMENTS

| | | |
|---|---|---|
| JP | 11354207 A | 12/1999 |
| JP | 2001189808 A | 7/2001 |
| JP | 2002-007004 A | 1/2002 |
| JP | 2002-007004 A1 | 1/2002 |
| JP | 2002123273 A | 4/2002 |
| JP | 2002261893 A | 9/2002 |
| JP | 2005109709 A | 4/2005 |
| JP | 2005520402 A | 7/2005 |
| JP | 2005269137 A | 9/2005 |
| JP | 2005295549 A | 10/2005 |
| JP | 2006094367 A | 4/2006 |
| KR | 10-2001-0037642 A | 5/2001 |
| TW | M247950 B | 10/2004 |
| TW | M249138 B | 11/2004 |
| TW | M253152 B | 12/2004 |
| TW | M268823 B | 6/2005 |
| TW | M290351 B | 5/2006 |
| TW | M292861 B | 6/2006 |
| TW | M294783 B | 7/2006 |
| TW | M298843 B | 10/2006 |
| WO | 2004098079 A1 | 11/2004 |
| WO | WO-2006/073702 A1 | 7/2006 |

OTHER PUBLICATIONS

DLO HomeDock Deluxe User Manual, 2006.*
AVR 140 Audio/Video Receiver Owner's Manual, Found online Mar. 28, 2007 at http://manuals.harman.com/HK/Owner%27s%20Manual/AVR%20140%20OM%20(web)%203-29-06.pdf, 2006, Publisher: Harman International Industries, inc.
Installing Harman Kardon's Drive + Play, Found online Mar. 28, 2007 at http://www.harmankardon.com/drive-1/docs/install.pdf, 2007, Publisher: Harman Kardon.
Entertainment Dock 500 for iPod, found online Mar. 27, 2007 at http://us.kensington.com/html/10117.html, 2006, Publisher: Kensington Computer Products Group.
Di Jasio, Lucid, Using KEELOQ to Validate Subsystem Compatibility—AN827, Application Notes—found online Mar. 28, 2007 at http://ww1.microchip.com/downloads/en/AppNotes/00827a.pdf, 2002, Publisher: Microchip Technology Inc.
Harman Kardon Go + Play Portable Loudspeaker for iPod, Found online Mar. 28, 2007 at http://www.mobilewhack.com/reviews/harman_kardon_go_play_portable_loudspeaker_for_ipod.html, 2006, Publisher: MobileWhack.com.
Sandisk, SanDisk Photo Album, found online Mar. 27, 2007 at http://www.sandisk.com/Products/Item(1153)-SDV2-A-SanDiskPhoto_Album.aspx, 2006, Publisher: SanDisk Corporation.
Sandisk, SanDisk Photo Album User Guide, found online Mar. 27, 2007 at http://www.sandisk.com/Assets/File/tech/docs/spa-user-guide-v1.1.pdf, 2004, Publisher: SanDisk Corporation.
Shop 4 Tech, Digital Photo Viewer Photo Album by SanDisk, found online Sep. 20, 2006 at www.shop4tech.com, 2006, Publisher: Shop4tech.com.
Spero, Ricky, Review—Harman/Kardon's Drive+Play, The Mac Observer—found online Mar. 27, 2007 at http://www.macobserver.com/review/2006/01/09.1.shtml, Apr. 14, 2006.
Vega, Michael, Complete battery-pack design for one- or two-cell portable applications, Analog Applications Journal—found online Mar. 28, 2007 at http://focus.ti.com/lit/an/slyt248/slyt248.pdf, 2006, pp. 14-16, vol. 3Q, Publisher: Texas Instruments, Inc.
Griffin 9801—TCENTER WiFi TuneCenter Home Media Center for iPod, Found online Mar. 28, 2007 at http://www.amazon.com/Griffin-9801-TCENTER-TuneCenter-Media-Center, 2006, Publisher: Amazon.com.
Apple iPod Universal Dock, The Apple Store—found online Mar. 28, 2007 at http://store.apple.com/1-800-MY-APPLE/WebObjects/AppleStore.woa/wa/RSLID?mco=6C04E07A&nplm=MA045G%2FC, 2007, Publisher: Apple Computer.
iPod: TV Out Support, Found online Mar. 28, 2007 at http://docs.info.apple.com/article.html?artnum=300233, 2006, Publisher: Apple Computer.

(56) References Cited

OTHER PUBLICATIONS

Hiner, Kirk, Harman Kardon 'bridges' iPod and home entertainment systems, Applelinks.com—found online Mar. 27, 2007 at http://www.applelinks.com/index.php/more/harman_kardon_quotbridgesquot_ipod_and_home_entertainment_sy Nov. 4, 2005, Publisher: CFC Productions.
Application Note 190—Challenge and Response with 1-Wire SHA devices, Found online Mar. 28, 2007 at http://www.maxim-ic.com/appnotes.cfm/appnote_number/190, Mar. 12, 2002, Publisher: Maxim Integrated Products.
DS2703—SHA-1 Battery Pack Authentication IC, Found online Mar. 28, 2007 at http://datasheets.maxim-ic.com/en/ds/DS2703.pdf, 2007, Publisher: Maxim Integrated Products.
TuneCenter—Home Media Center for iPod, found online at http://www.griffintechnology.com/products/tunecented, 2006, Publisher: Griffin Technology.
Harman/Kardon, The Bridge—Owner's Manual, Found on-line Feb. 21, 2007 at https://www.hci-services.com//tech_doc/documents, 2005, Published in: Northridge, CA.
Apple Expo: Harman Kardon Introduces Car Audio Solution for the iPod, found online Mar. 27, 2007 at http://www.prnewswire.co.uk/cgi/news/release?id=154010, Sep. 19, 2005, Publisher: PR Newswire on behalf of Harman Consumer Group International.
iPod AV Connection Kit, The Apple Store—found online Mar. 28, 2007 at http://store.apple.com/1-800-MY-APPLE/WebObjects/AppleStore.woa/wa/RSLID?mco=6C04E07A&nplm=MA242LL%2FC, 2007, Publisher: Apple Computer.
Co-pending U.S. Appl. No. 11/400,414.
U.S. Appl. No. 11/400,414, Paul Griffin, Jr.

\* cited by examiner

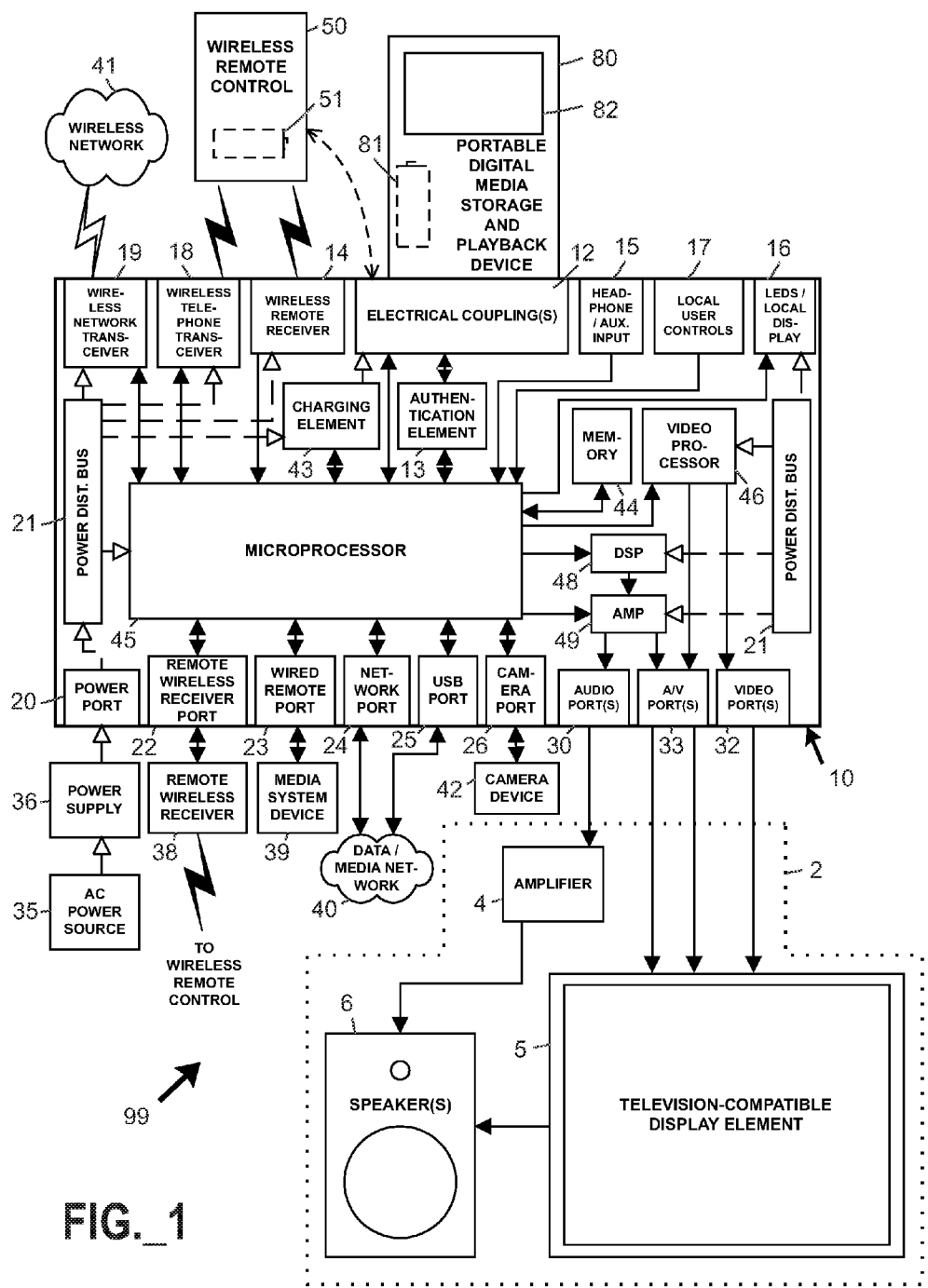
FIG._1

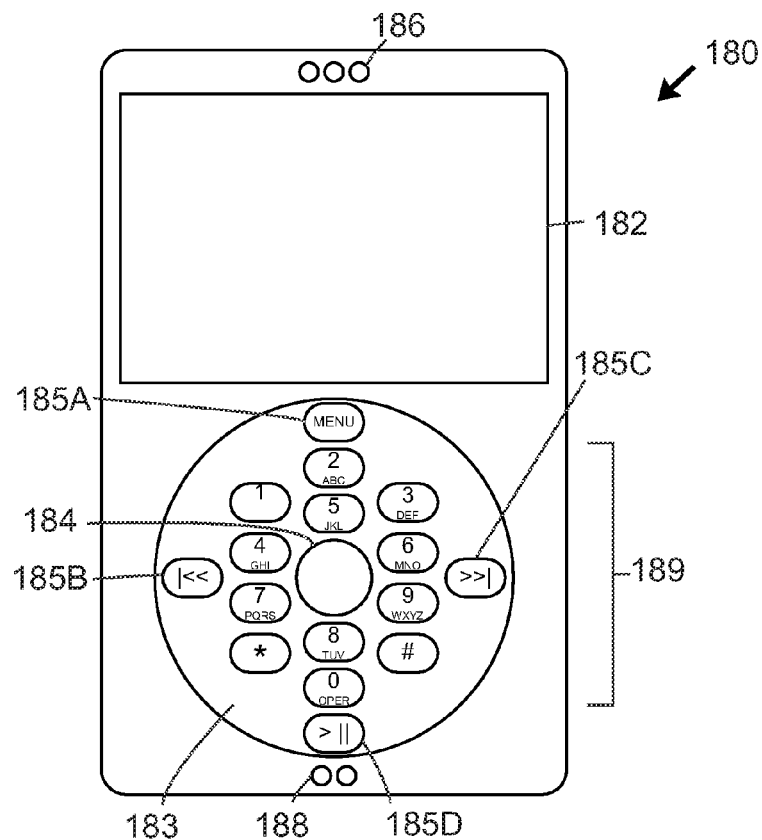
FIG._2A
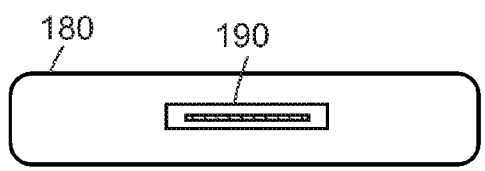
FIG._2B

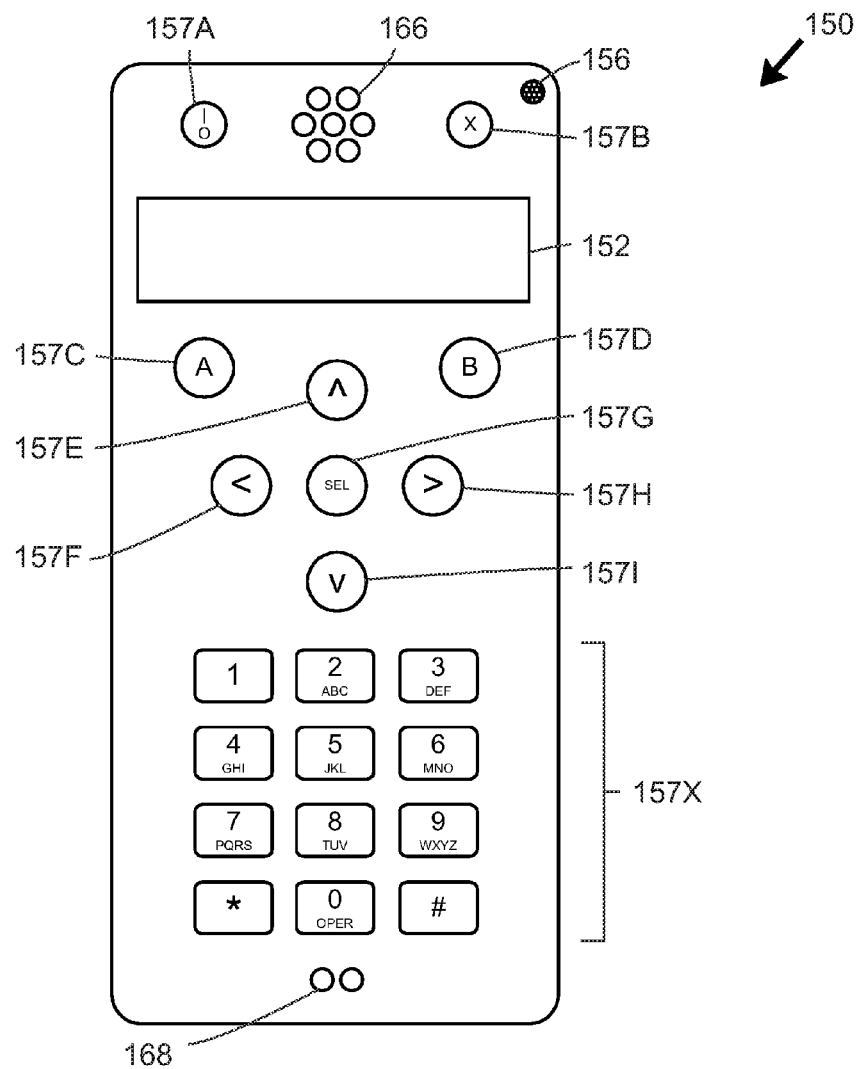
FIG._4A
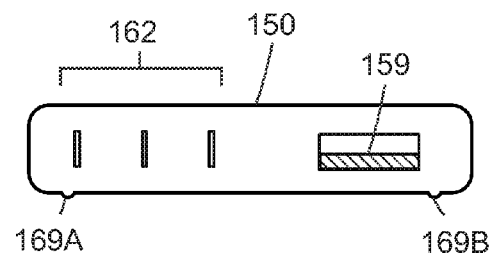
FIG._4B

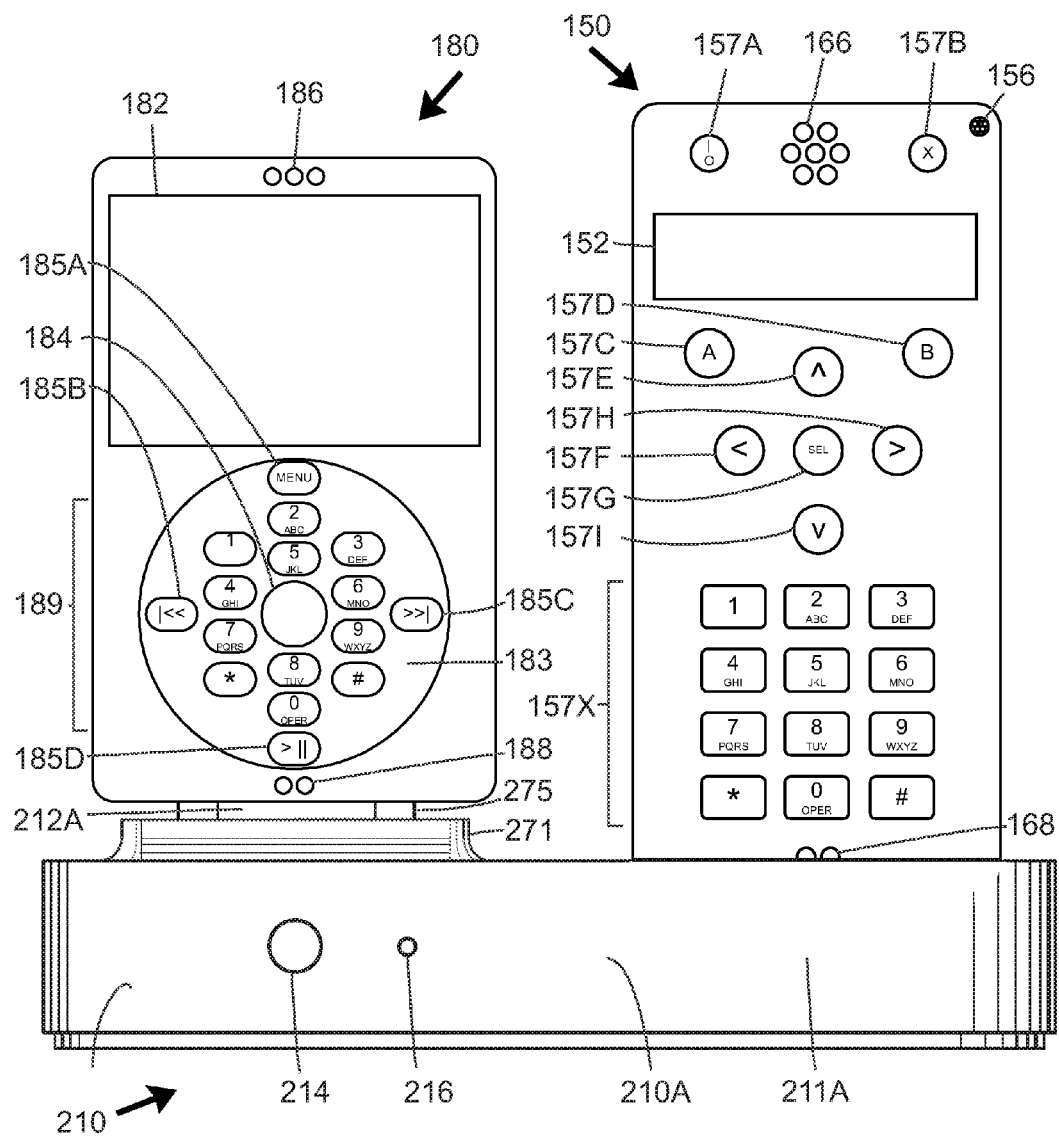
FIG._7

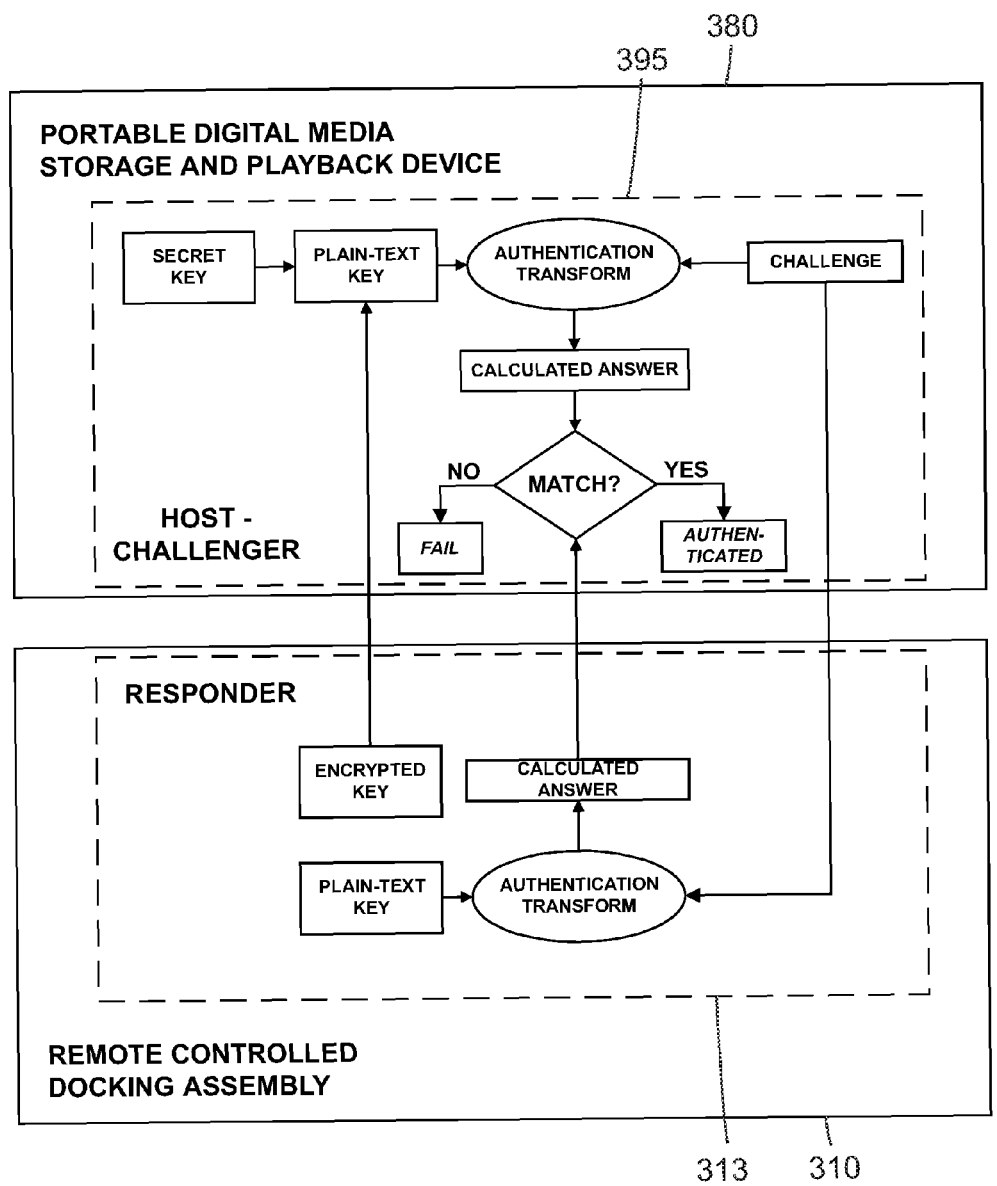
FIG._8

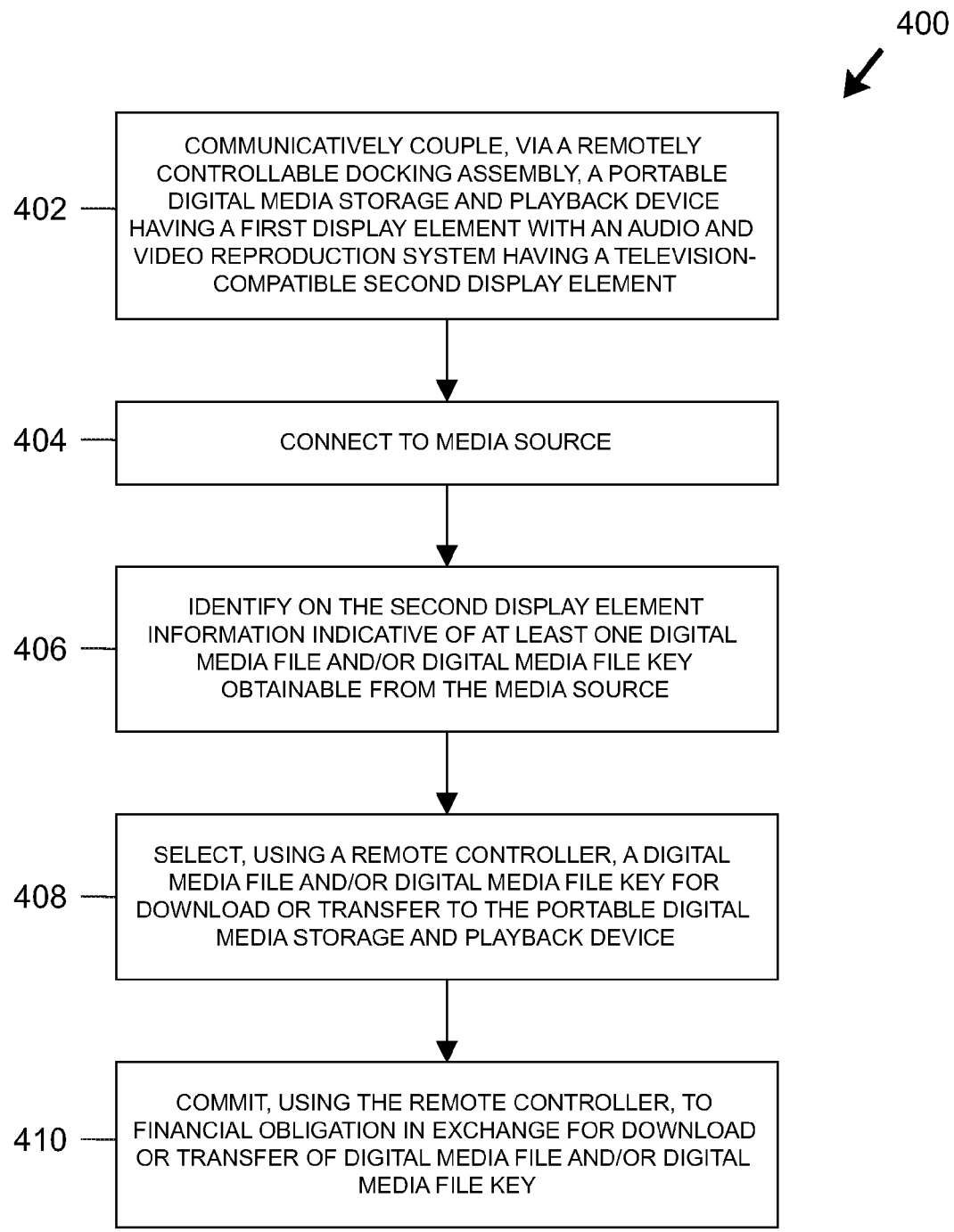
FIG._10

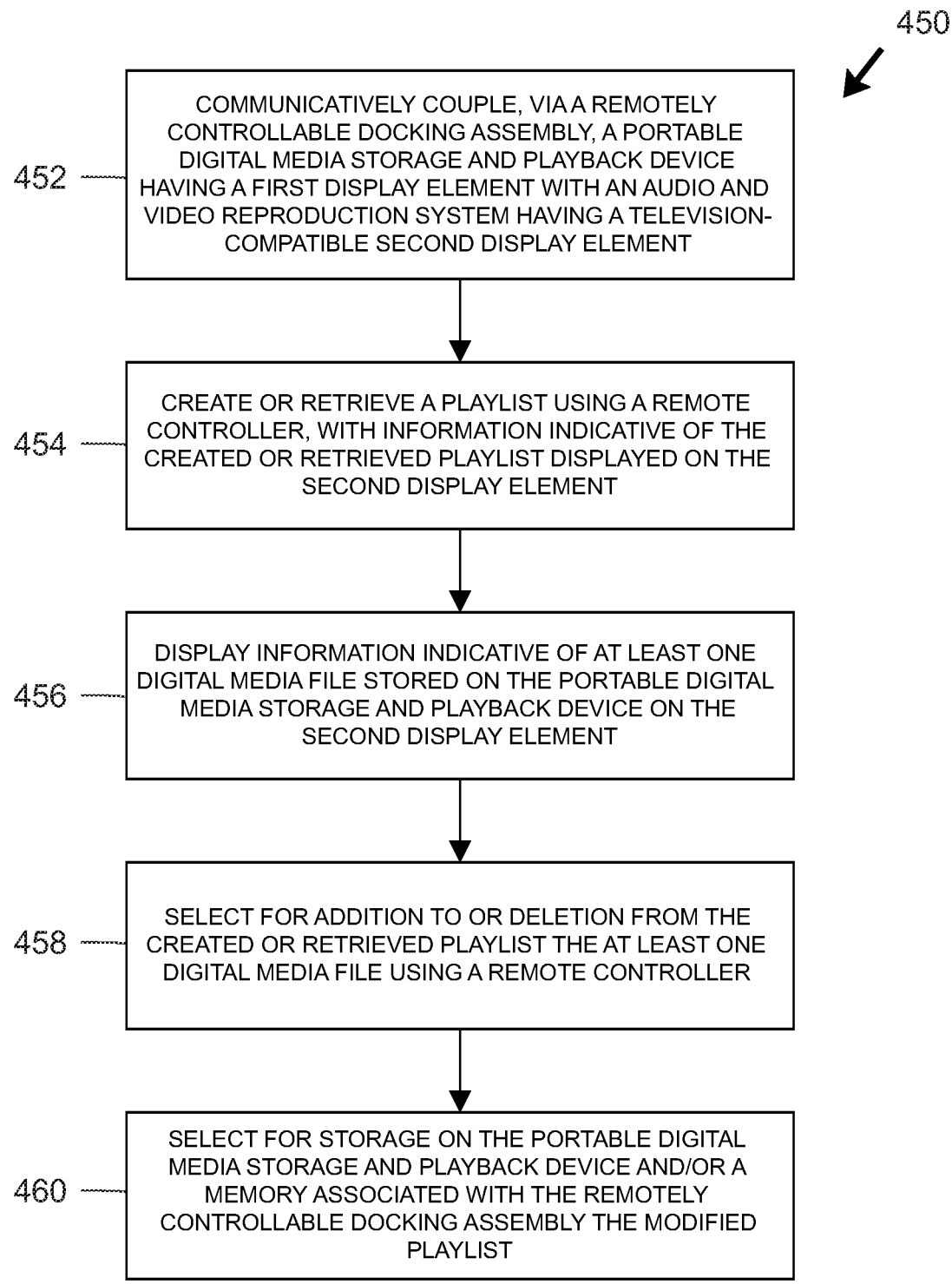
FIG._11

INTERFACE SYSTEMS FOR PORTABLE DIGITAL MEDIA STORAGE AND PLAYBACK DEVICES

BACKGROUND OF THE INVENTION

Field of the Invention

This invention relates to accessories for portable digital media storage and playback devices used for on-line downloading, storing and playing digital media files such as, for example, MP3 (i.e., MPEG-1 audio layer 3) audio, WMA (Windows Media Audio) audio, MPEG-4 multimedia, and QuickTime multimedia files. More specifically, the invention relates in various aspects to a multi-function docking assembly, preferably remotely controllable, providing any of the following functions: signal transmission, signal relaying, remote control, remote video interface, power supply and/or charging, and authentication for portable digital media storage and playback devices, and methods pertaining to the same.

Description of the Related Art

Media players of various types are ubiquitous throughout the world, and have evolved through various forms over the years, from portable single transistor radios in the 1950's to tape cassette players, to compact disc players, and more recently to portable digital media storage and playback devices that enable a user to obtain digital media files (e.g., by download from an Internet site) and store same in storage medium of a player in any of various preferably compressed formats for subsequent selective playback.

Preferred digital media storage and playback devices utilize hard drives and/or flash memory to store digital media files. A number of digital media storage and playback devices have been developed and are commercially available, including: the iPod® family of products manufactured by Apple Computer, Inc.; the iRiver® family of products manufactured by iRiver Inc.; the Nomad™, Zen™ and MuVo® families of products manufactured by Creative Technology, Ltd.; the Rio® family of products manufactured by Digital Networks North America, Inc.; the DJ™ family of products manufactured by Dell Computer, Inc.; the Lyra® family of products manufactured by RCA/Thomson Multimedia, Inc.; and the Yepp'® and neXus™ families of products manufactured by Samsung Electronics Co., Ltd. Such devices having varying capacities but models permitting the storage of approximately 1000 or more commercial play length audio files are commonplace. Substantial memory capacity may be provided by the presence of a hard disk and/or flash memory, with certain models enabling the removal of flash memory cards in formats such as Secure Digital or Compact Flash. Digital media storage and playback device models having sophisticated displays are further able to store and playback image and/or video files.

Media storage and playback devices of the aforementioned type rely on batteries for their portability, and are typically provided with a headphones jack to which headphones may be connected to provide personal entertainment.

One problem associated with the small size and lightweight characteristics of portable digital media storage and playback ("PDMSP") devices, as requisite to their portability and ease of use, is battery life. Another problem is the personal character of the headphone-equipped PDMSP devices. A PDMSP device may be equipped with a video display and a speaker, but its small size and light-weight characteristics limit the size of the display and speaker, making it less than desirable when a user seeks to transmit audio or video from the PDMSP device to a group of persons, such as in a room or in the passenger compartment of a passenger vehicle.

Another limitation associated with conventional PDMSP devices is their reliance on personal computers as a primary interface for loading, purchasing, and organizing media files. Aside from the expense attendant to personal computers, such devices are often tailored for and stationed in rooms designated for work—such as offices—and may be difficult to integrate with multimedia (e.g., television, audio, and communication) entertainment devices tailored for and stationed in rooms designated for recreation—such as living rooms or home theaters. An owner of a personal computer may desire to unwind by purchasing or organizing multimedia files for storage and viewing on a PDMSP device, yet avoid the process altogether so as to avoid the temptation to check email messages as they arrive to the computer. Additionally, furnishings in entertainment rooms such as living rooms and home theaters usually are substantially more inviting and comfortable than office chairs. Thus, a highly functional accessory device for interfacing with PDMSP devices, with such accessory being suitable for use in entertainment rooms and not requiring use of a personal computer, would be desirable.

Yet another limitation associated with conventional PDMSP devices is their absorptive entertainment quality, leading to the occasional difficulty of alerting the user to potentially important interruptions such as telephone calls. It would be desirable to provide an accessory device capable of alerting a PDMSP user to the existence of a potential interruption such as an incoming telephone call, of permitting the user to rapidly determine whether to receive the incoming call, and to conveniently initiate acceptance of the call while pausing or muting media playback to minimize conversational distraction.

Various accessories have been developed for use with PDMSP devices. For manufacturers and purchasers of PDMSP devices, it would be desirable to ensure and/or regulate interoperability between such devices and accessories intended to connect therewith. For example, the original equipment manufacturer (OEM) of a PDMSP device may wish to avoid warranty claims and/or reputational damage that might result due to operating problems or hardware failures (e.g., inferior sound quality, battery overcharging, etc.) when the PDMSP device is connected with an accessory device of questionable quality sourced by a supplier of unknown repute. It may be difficult for an end user to determine the quality of an accessory device without purchasing the accessory and possibly learning "the hard way," i.e., through failure of the accessory or damage to the PDMSP device. Additionally, or alternatively, the PDMSP device OEM may wish to regulate the interoperability of accessories with the PDMSP device to derive additional revenue by producing accessories itself or by licensing to third parties the right to produce such accessories. Restricting by license the availability to preferred third party accessory manufacturers of proprietary interface components such as connectors can provide some degree of control to PSMSP device OEMs in this regard; however, such tactics may be circumvented by unlicensed parties with relative ease by copying such interface connectors.

Accordingly, there exists a need for improved accessories for use with portable digital media storage and playback devices.

SUMMARY OF THE INVENTION

In a first aspect of the invention, a docking assembly adapted for use in interfacing (1) a portable digital media storage and playback device having a first display element with (2) an audio and video reproduction system having a television-compatible second display element and a first audio amplifier adapted to drive at least one speaker, comprises: an electrical coupling adapted to engage the portable digital media storage and playback device; a microprocessor adapted to communicate with the portable digital media storage and playback device through the electrical coupling; a remote control receiver adapted to receive an input signal from a wireless remote controller device and to provide an output signal to the microprocessor; an audio output port adapted to communicate an audio signal to the first audio amplifier; a video output port adapted to communicate a television-compatible video signal to the second display element; a video processor in communication with the microprocessor, the video processor being adapted to communicate to the video output port a television-compatible video signal indicative of a signal received from the portable digital media storage and playback device for display by the second display element; and a unitary body structure, wherein the electrical coupling, microprocessor, audio output port, video output port, and video processor are disposed in or on the unitary body structure.

In another aspect of the invention, a docking assembly adapted for use in interfacing (1) a telephonic portable digital media storage and playback device having a first display element with (2) a media reproduction system having a first audio amplifier adapted to drive at least one speaker, comprises: an electrical coupling adapted to engage the portable digital media storage and playback device; a microprocessor adapted to communicate with the portable digital media storage and playback device through the electrical coupling; a remote control receiver adapted to receive an input signal from a wireless remote controller device and provide an output signal to the microprocessor; an audio output port adapted to communicate an audio signal to the first audio amplifier; and a telephone rebroadcast transceiver adapted to wirelessly communicate telephonic signals between (a) the telephonic portable digital media storage and playback device, and (b) the remote controller device.

In another aspect of the invention, a docking assembly adapted for use in interfacing (1) a telephonic portable digital media storage and playback device with (2) a media reproduction system having a first audio amplifier adapted to drive at least one speaker, comprises: an electrical coupling adapted to engage the portable digital media storage and playback device; a microprocessor adapted to communicate with the portable digital media storage and playback device through the electrical coupling; a remote control receiver adapted to receive an input signal from a wireless remote controller device and adapted to provide an output signal to the microprocessor; an audio output port adapted to communicate an audio signal to the first audio amplifier; and a signal transmitter adapted to wirelessly communicate a signal indicative of a telephonic signal from the telephonic portable digital media storage and playback device to the remote controller device.

In another aspect of the invention, a remote controller device adapted to control any of a telephonic portable digital media storage device, a media reproduction system, and a docking assembly adapted for use in interfacing the telephonic portable digital media storage device with the media reproduction system, comprises: a wireless signal receiver adapted to receive a telephonic signal from the docking assembly; a speaker adapted to reproduce an audible signal indicative of the received telephonic signal; a voice transducer adapted to produce an electrical vocal output signal; a first wireless signal transmitter communicatively coupled to the voice transducer and adapted to transmit a telephonic signal indicative of the electrical vocal output signal; a second wireless signal transmitter adapted to provide a control signal to the docking assembly; and a charge storage element suitable to provide electric power to any of the signal receiver, the speaker, the first signal transmitter, and the second signal transmitter.

In another aspect of the invention, a method for selecting a digital media file for download or transfer includes the steps of: (A) communicatively coupling, via a remotely controllable docking assembly, (1) a portable digital media storage and playback device having a first display element, with (2) an audio and video reproduction system having a television-compatible second display element and a first audio amplifier adapted to drive at least one speaker, wherein the docking assembly comprises (i) a video output port adapted to communicate a television-compatible video signal to the second display element, and (ii) a video processor adapted to communicate to the video output port a television-compatible video signal indicative of a signal received from the portable digital media storage and playback device for display by the second display element, and wherein the docking assembly has an associated remote controller; (B) identifying on the second display element information indicative of any of (1) a digital media file, and (2) a digital media file key, as available for download or transfer to the portable digital media storage and playback device; and (C) selecting for download or transfer of any of the digital media file and the digital media file key using the remote controller.

In another aspect of the invention, a method of selecting at least one digital media file for addition to a playlist includes the steps of: (A) communicatively coupling, via a remotely controllable docking assembly, (1) a portable digital media storage and playback device having a first display element, with (2) an audio and video reproduction system having a television-compatible second display element and a first audio amplifier adapted to drive at least one speaker, wherein the docking assembly comprises (i) a video output port adapted to communicate a television-compatible video signal to the second display element, and (ii) a video processor adapted to communicate to the video output port a television-compatible video signal indicative of a signal received from the portable digital media storage and playback device for display by the second display element, and wherein the docking assembly has an associated remote controller; (B) identifying on the second display element information indicative of at least one digital media file; and (C) selecting for addition to a playlist the at least one digital media file using the remote controller.

In another aspect of the invention, a docking assembly is coupleable with a PDMSP device having an electrical coupling and an electrical charge storage element, and the docking assembly comprises: (A) a body having a support element and an electrical connector, wherein the support element is adapted to receive at least a portion of the portable digital media storage and playback device, and the electrical connector is adapted to simultaneously engage the electrical coupling when the at least a portion of the portable digital media storage and playback device is received by the support element; (B) at least one electrical circuit element adapted to conduct power from an external power source to the at least one electrical coupling for any of (1) powering the portable digital media storage and playback device, and (2) charging the electrical charge storage element; and (C) at least one communication element adapted to communicate a signal indicative of digital media content played by the portable digital media storage and playback device to a media signal reproduction system having an amplifier and at least one speaker, wherein the media reproduction system is adapted to reproduce the signal indicative of digital media content in user-perceptible form. Such embodiment may further include circuitry adapted to control operation of a user-perceptible display element.

Another aspect of the invention relates to the addition of authentication elements and steps to the foregoing devices and methods.

In another aspect of the invention, any of the foregoing aspects may be combined for additional advantage.

Other aspects, features and embodiments of the invention will be more fully apparent from the ensuing disclosure and appended claims.

BRIEF DESCRIPTION OF THE DRAWINGS

FIG. 1 is a block schematic view of a docking assembly controllable via a remote controller and adapted for use in interfacing a portable digital media storage and playback device with an audio and video reproduction system having a television-compatible display element, the combination of elements comprising an entertainment system.

FIG. 2A is a front elevation view of a telephonic portable digital media storage and playback device.

FIG. 2B is a bottom view of the telephonic portable digital media storage and playback device of FIG. 2A.

FIG. 4A is a front elevation view of the remote controller device of FIG. 3.

FIG. 4B is a bottom view of the remote controller device of FIG. 4A.

FIG. 7 is a front view of the docking assembly of FIGS. 5-6 having docked thereto the portable digital media storage and playback device of FIGS. 2A-2B and the remote controller device of FIGS. 4A-4B.

FIG. 8 is a functional block diagram for an authentication scheme that may be utilized by and between a remote controlled docking assembly according to the present invention and a portable digital media storage and playback device.

FIG. 10 is a flowchart of various steps of a method employing a remote controller and a remotely controlled docking assembly as disclosed herein for purchasing digital media files and/or digital media file keys for download or transfer to a portable digital media storage device.

FIG. 11 is a flowchart of various steps of a method employing a remote controller and a remotely controlled docking assembly as disclosed herein for creating, modifying, and storing playlists of digital media files useable with a portable digital media storage device.

DETAILED DESCRIPTION OF THE INVENTION, AND PREFERRED EMBODIMENTS THEREOF

Figure 3:
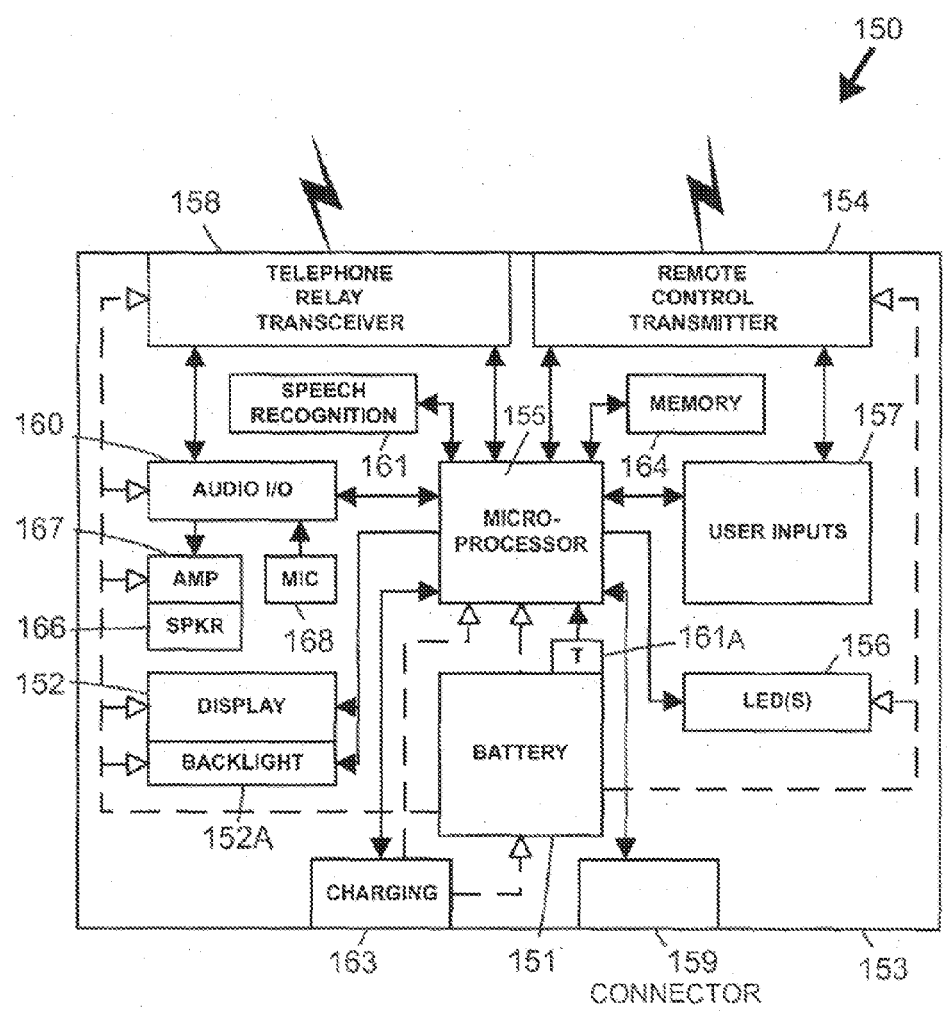
FIG. 3 is a schematic view of a remote controller device for use with a docking assembly adapted to receive a telephonic portable digital media storage and playback device, the remote controller device having an integral telephone relay transceiver, a microphone, and a speaker.

In certain aspects, the present invention provides a remote controlled docking assembly for a portable digital media storage and playback device that dramatically increases the utility of a portable digital media storage and playback (PDMSP) device. A docking assembly according to the present invention preferably serves as a remotely controllable interface between a PDMSP device and an audio and video reproduction system having a television-compatible display element without requiring the use of a personal computer, while powering and/or charging the PDMSP device. The audio and video reproduction system, which may be disposed in a stationary (e.g., home) or vehicular environment, enables digital media files such as any of music, photos, videos, games, and the like to be reproduced in a form perceptible to many people. By migrating away from a personal computer to an entertainment system as a primary interface for a PDMSP device, the appeal of a PDMSP device is greatly expanded not only for the primary user's sole enjoyment, but also for sharing the entertainment experience with groups of users.

Various embodiments provide additional capabilities such as, for example, telephonic communication, remote controlled media file purchase and organization, and device authentication capabilities. Still further features provided in certain embodiments include wired or wireless network connectivity, interconnectivity with enhanced remote control components and remote controls for other media system devices, and video telephony capabilities.

FIG. 1 illustrates an entertainment system 99 including a docking assembly 10 remotely controllable via a remote controller (preferably a wireless remote controller, although a wired remote controller may be used) and adapted for use in interfacing a portable digital media storage and playback (PDMSP) device 80 with an audio and video reproduction system 2 having a television compatible display element 5, an (audio) amplifier 4, and at least one speaker 6. The PDMSP device 80 has a battery or other charge storage element 81, and a first display element 82 that is typically a special purpose LCD display or a special purpose LED display. Signals communicated within the PDMSP device 80 for display by the first display element 82 are typically formatted for a special purpose first display element 82, and such signals are typically not television-compatible. The PDMSP device 80 has an onboard memory element, such as a hard disk drive and/or flash memory, and is preferably adapted to store and play back digital audio and video files of various formats. The PDMSP device 80 preferably has at least one electrical connector (such as the connector 190 shown in FIG. 2B) adapted to provide an interface for powering and/or charging PDMSP device 80 as well as providing communication utility. Communication between the PDMSP device 80 and the docking assembly 10 may also be provided through a headphone or auxiliary input port 15 optionally provided in or on the docking assembly 10. Such auxiliary input port 15 enables the docking assembly 10 to work with a wide variety of different portable digital media storage and playback devices. In one embodiment, the auxiliary input port 15 comprises a 3.5 mm diameter female port adapted to receive both audio and video signals.

The docking assembly 10, which preferably comprises a unitary body structure (such as the body structure 210A illustrated in FIGS. 5-6) has an associated remote controller 50 (preferably a wireless remote controller) with a battery or other charge storage element 51. The docking assembly 10 may include an internal or external antenna (not shown). If wireless, the remote controller 50 may be adapted to operate at any desirable frequency of the electromagnetic spectrum. For example, a wireless remote controller 50 may include an infrared and/or a radio frequency (RF) transmitter. Operable RF frequencies in one embodiment include a range from about 800 MHz to about 10 GHz. Any desirable frequency suitable for wireless communication of the required bandwidth may be used.

The docking assembly 10 has at least one electrical coupling 12 adapted to mate with one or more corresponding connector(s) of the PDMSP device 80, with the at least one electrical coupling optionally including one or more coupling(s) adapted to mate with one or more corresponding connector(s) of a wireless remote controller 50. The at least one electrical coupling 12 preferably includes at least one coupling adapted to mate with the PDMSP device 80, and at least one coupling adapted to mate with a wireless remote controller 50. Any coupling of the at least one coupling may protrude into or otherwise be disposed in a recess (e.g., recess 272 shown in FIG. 5) adapted to receive one of the PDMSP device 80 or the remote controller 50, or may be elevated (e.g., atop a raised surface portion such as raised surface 271 shown in FIG. 5) relative to an upper surface (e.g., upper surface 211C shown in FIGS. 5-6) of the docking assembly 10.

As illustrated, the docking assembly 10 includes a wireless remote receiver 14, preferably disposed on an exposed front surface (e.g., front surface 211A shown in FIGS. 5-7) of the docking assembly 10. (While it is preferred that the remote controller 50 be wireless, if such remote controller is a wired remote, then it is understood that the wireless remote receiver 14 may be omitted.) The docking assembly 10 may further include a remote wireless receiver port 22 to which a secondary remote wireless receiver 38 (e.g., a radio frequency or an infrared receiver) may be communicatively coupled. Such a secondary remote wireless receiver 38 preferably operates at the same frequency or frequency range as a wireless remote controller 50. If provided, positioning the secondary remote wireless receiver 38 in signal-receiving proximity to the remote controller 50 permits the docking assembly 10 to be placed together with various media system components (e.g., the amplifier 4 and other associated components) in any convenient or aesthetically pleasing environment, such as in a cabinet or closet not necessarily disposed in proximity to (or in a light of sight of) the wireless remote controller 50.

To provide enhanced remote control capability of, or communication capability with additional components, such as components associated with the audio and video reproduction system 2 (e.g., components such as, but not limited to, the amplifier 4 and various media player devices such as a CD or DVD changer) or a personal computer, the docking assembly 10 may further include a wired remote port 23 permitting communications with a various other media system devices 39. The wired remote port 23 preferably provides a serial interface. For example, the wired remote port 23 may permit communications with other media or computing devices according to the EIA232 (formerly RS-232) standard and disposed remotely relative to the docking assembly 10. Other communication protocols may be employed as will be readily apparent to one skilled in the art. Utilization of the wired remote port 23 interconnected with other independently controllable media system device(s) 39 may permit at least certain functions of the docking assembly 10 to be controlled with a wireless remote controller other than the wireless remote controller 50 specifically adapted for use with the docking assembly 10.

Communication between the docking assembly 10 and various data or media networks 40 may be provided by wired or wireless means. For example, the docking assembly 10 may include at least one (wired) port 25 preferably having an appropriate cable terminator and any filter or electronic communication equipment (e.g., modem, multiplexer, transceiver and/or transducer) appropriate to the cable and communication standard employed. In one embodiment, the port 25 is adapted for Ethernet, Fast Ethernet, Gigabit Ethernet, or 10-Gigabit Ethernet, or other computing device standard communication protocol for use with a telecommunications network 40 that preferably includes connectivity to a distributed network such as the World Wide Web and the Internet. In another embodiment, the port 25 includes a coaxial cable receptacle and cable modem, or fiber optic receptacle and multiplexer/demultiplexer, and is adapted for use with a computing or media network, such as a two-way media network of a cable or satellite telecommunication (e.g., television) provider. In still another embodiment, the port 25 includes a telephonic cable receptacle and telephonic modem and/or direct subscriber line (DSL) modem to enable communication with a wired telephonic communication network.

In certain embodiment, the docking assembly 10 may include an integral wireless network transceiver 19 adapted for communicating with a wireless network 41 that may be connectable to the Internet and/or World Wide Web. The wireless network 41 may include a wireless local area network (WLAN), such as an IEEE 802.16-compliant (Wi-Max) network, IEEE 802.11-complaint (Wi-Fi) network, an IEEE 802.15.1-compliant (Bluetooth) network, or similar or equivalent networks, such as to permit free or paid transfer of digital media files, digital media file keys, and the like, between a network and the PDMSP device 80 docked with the docking assembly 10, or between a network and a memory element 44 (e.g., a NAND or other flash memory) associated with the docking assembly 10. Such a network 41 may further include capability to stream stored digital media content played by the PDMSP device 80 (i.e., when docked to the docking assembly 10) over the network 41 to a network-connectable remote device (not shown) having an associated audio and/or video reproduction system. For example, a PDMSP device 80 may be docked with the docking assembly 10 in a first location in a first room within a particular facility (e.g., a home or office) having a first audio and video reproduction system receiving media content from the PDMSP device via the audio and/or video ports 30, 32, 33 locally disposed at the docking assembly 10, while media content is simultaneously broadcast via the wireless network transceiver 19 and the network 41 to an appropriate receiving device (not shown) disposed in a second room of the facility, outside the facility, or even in a remote facility, for reproduction via a second audio and video reproduction system (not shown). The docking assembly 10 may include an internal or external antenna (not shown) adapted for use with the wireless network transceiver 19. As an alternative to including an integral wireless transceiver 19, the wired network port 25 may be adapted to connect with a separate wireless transceiver (not shown) providing the same or equivalent wireless communication capability.

The docking assembly 10 may further include a Universal Serial Bus (USB) port 25 to enable connection with other USB-enabled networks (e.g., network 40) or USB-enabled devices including personal computers or other network appliances (not shown). The USB port may be configured to display the docking assembly and/or any PDMSP device 80 docked thereto as a network drive, and enable transfer of media files, data, and operable programs or applications between the PDMSP device 80 and an interconnected personal computer or network appliance (not shown). The USB port 25 may further be used, for example, to enable configuration, updating, or troubleshooting of the docking assembly 10 with a peripheral device such as personal computer, PDA, or dedicated diagnostic device (not shown).

In one embodiment, the docking assembly 10 includes a wireless telephone transceiver 18 adapted to rebroadcast telephonic signals between a telephone-enabled remote device (e.g., the telephonic remote controller 150 illustrated in FIG. 3 and FIGS. 4A-4B) and a telephonic PDMSP device (such as the telephonic PDMSP device 180 illustrated in FIGS. 2A-2B.) Such a telephonic PDMSP device preferably includes wireless (e.g., cellular) telephone capability and is adapted to execute any of various conventional portable telephone functions such as sending or receiving telephone calls, sending or receiving data such as email or text messages, connecting to wireless data networks, and the like. The term "rebroadcast" in the context of the wireless telephone transceiver 18 refers to the capability to retransmit or otherwise relay incoming telephonic signals from a telephonic PDMSP device to a wireless telephonic device (e.g., the telephonic remote controller 150) and to similarly receive incoming signals from the wireless telephonic device for forwarding to a transmitter portion of the telephonic PDMSP device. The wireless telephone (rebroadcast) transceiver 18 associated with the docking assembly 10 preferably operates at the same frequency or frequencies as the telephone transceiver 158 associated with a telephonic remote controller device (e.g., the device 150). Any suitable frequency range may be used, whether analog or digital, and whether fixed frequency or spread spectrum. Preferably, such transceivers 18, 158 operate at a frequency range of from about 800 MHz to about 10 GHz, specifically including the frequencies of any of 900 MHz, 1.9 GHz, 2.4 GHz, and 5.8 GHz. The term "transceiver" in this context refers to any combination of transmitter and receiver present in the same device (e.g., PDMSP device or remote controller device), whether or not such components are integrated at the microchip level. The wireless telephone transceiver 18 associated with the docking assembly 10 thus transfers user input and output telephonic functions in a seamless fashion from the telephonic PDMSP device (e.g., PDMSP device 180) to a telephone-enabled remote device (e.g., the telephonic remote controller 150) while the PDMSP device is docked with the docking assembly 10, with signals between the PDMSP device and docking assembly 10 preferably being routed through the at least one electrical coupling 12 and mated connector 180. Such telephonic function transfer provides substantial convenience to the user, since the PDMSP device need not be retrieved and undocked from the docking assembly 10 to screen, send, and/or receive audio or data communications.

Preferably, telephonic signals communicated by the telephone rebroadcast transceiver 18 to the telephonic remote device (e.g., the device 150) include notification signals and caller identification information sufficient to notify the user of the existence of an incoming call and to provide some identification of the caller, so as to enable the user to assess whether to accept the incoming call. The telephonic remote device, which preferably includes a display (e.g., the display 152 illustrated in FIG. 3), preferably includes at least one communication (e.g., call) notification elements. A communication notification element may provide any user-perceptible notification signal, and may provide visible notification, audible notification, and/or vibratory or other tactile notification of an incoming or received (and stored) communication such as a telephone call, text message, email message, video message, video conference invitation, digital media file, or the like. Visible notification may be provided via any of the display 152 (or a portion thereof) and a dedicated LED 156 (as illustrated in FIG. 3) or any other appropriate visible notification element. Audible notification may be provided by the speaker 166 (as illustrated in FIG. 3) or a dedicated audible notification element such as a ringer. Upon notification of an incoming call, the user may elect to receive the call by activating a user input element 157. The user may further utilize a user input 157 to optionally pause or mute playback of any digital media stored in the PDMSP device at the time a call is placed or received.

Preferably, digital media files may be played by, or stored to, a telephonic PDMSP device while the telephonic PDMSP device (e.g., device 180) is sending or receiving telephonic signals (i.e., enabling the user to engage in a telephone call) and the docking assembly 10 is simultaneously engaged in rebroadcast communication of telephonic signals between PDMSP and a remote telephonic device (e.g., remote controller device 150).

In a preferred embodiment, the wireless telephone transceiver 18 is distinct from the wireless remote receiver 14, with such elements operating at different frequencies, to permit telephonic and remote control functions to be performed independently from one another. In another embodiment, the wireless remote receiver 14 may be integrated with the wireless telephone transceiver 18 (or at least a receiver portion thereof), with the telephonic and remote control functions utilizing a common frequency range. Such embodiment may promote economies of cost and size in the docking assembly 10 and the telephonic remote controller 150 (as illustrated in FIG. 3 and FIGS. 4A-4B).

A camera port 26 may be provided in the docking assembly 10 to permit interconnection of a camera device 42, such as may be useful for video telephony and/or to capture video footage of an event for recordation in the PDMSP device 80 and/or a memory device 44 (e.g., a hard drive, flash memory, or other suitable memory format) associated with the docking assembly 10. The camera device 42 may be integrated into a the docking assembly 10, but more preferably the camera device 42 is separate from the docking assembly 10 to permit the camera device 42 to be placed in any appropriate position for the desired end use. In one embodiment, the camera device 42 comprises a wireless receiver for use with a wireless camera device (not shown), thus providing enhanced freedom in camera placement for the desired end use. The camera device 42 is preferably adapted to output a compressed data format suitable for transmission over a network, such as a conventional telephonic or cellular network, to enable video telephony. In a preferred embodiment, the output format and/or data output rate of the camera device 42 is user-configurable to provide an output appropriately tailored to the memory available, network limitations, and/or desired end use.

In one embodiment, a telephonic remote controller includes a camera (e.g., a video camera) and is adapted to send and receive video signals, with received video signals being displayable locally at the telephonic remote controller (e.g., the controller 150 illustrated in FIG. 3 and FIGS. 4A-4B) on the display element 152 to permit video telephony. Preferably, user inputs associated with the telephonic remote controller may be used to enable audio and video reproduction via the local speaker 166 plus local display element 152 and/or on the television-compatible display element 5 that is associated with the audio and video reproduction system 2 communicatively linked to a telephonic PDMSP device (e.g., the device 180) via the docking assembly 10.

The docking assembly 10 of FIG. 1 employs various elements requiring direct current (DC) power, such as the microprocessor 45. To adapt the docking assembly 10 for use with an alternating current (AC) power source 35, a switching (e.g., rectified) power supply 36 (which is preferably external to the docking assembly 10) is interposed between the AC power source 35 and a power port 20 provided in the docking assembly 10. In one embodiment, a DC power adapter (not shown) may be substituted for the power supply 36 to adapt the docking assembly 10 to a DC power source such as may be present in an automobile, recreational vehicle, airplane, or similar mobile environment having an audio and video reproduction system 2. Within the docking assembly, a power distribution bus 21 provides power at voltages and current levels appropriate to various internal elements, as shown with dashed lines internal to the docking assembly 10 in FIG. 1. Internal to the docking assembly 10, at least one charging element 43 is provided to furnish power at appropriate levels to power the PDMSP device 80 and wireless remote controller device 50 and/or charge the batteries associated with the devices 80, 50 when such devices 80, 50 are docked with the docking assembly 10 via the at least one electrical coupling 12. The at least one charging element 43 includes at least one electrically conductive circuit element, with appropriate current transducers preferably provided to sense and permit regulation of current flow so as to minimize the possibility of overcharging the battery 81 associated with the docked PDMSP device 80 and/or the battery 51 associated with the remote controller device 50. The charging element 43 and/or at least one electrical coupling 12 may further include an associated temperature transducer such as a thermistor or thermocouple (not shown) to provide thermal feedback suitable for regulating electrical charge supplied to the batteries 81, 51 of the docked device(s) 80, 50. In one embodiment, electrical charge is supplied to the docked PDMSP device 80 and/or remote controller device 50 at a first rate while such device batteries 81, 51 are charging, and then supplied at a second, lower "maintenance" rate when such devices batteries 81, 51 are fully charged to power the devices 80, 50 without overcharging their batteries 81, 51. When such batteries 81, 51 are fully charged, the charging element 43 may be used to assist in powering the PDMSP device 80.

The docking assembly 10 may include various local user controls 17 (e.g., disposed on a front, top, or other accessible surface of the assembly) adapted to control the docking assembly and/or certain functions of a PDMSP device 80 docked thereto. Examples of local controls include power buttons or switches, volume buttons, a mode selector button or switch (e.g., to permit a user to select between any of various audio and video output modes, or between any of various audio or video output formats), and the like. Owing to the enhanced functionality provided by a wireless remote controller device 50, however, local controls 17 may be minimized in functionality or eliminated altogether if desired.

Local indication of basic functionality such as power on, docking status, communication status, and the like may be provided with one or more LEDs 16, which are preferably disposed on an outwardly visible portion (e.g., the front surface) of the docking assembly 10. Multiple LEDs or a smaller number of multi-color LEDs may be employed to provide different status indications, if desired.

A primary function of the docking assembly 10 is to serve as an audio/video interface between a PDMSP device 80 docked thereto and an audio and video reproduction system 2 having a television-compatible display element 5. Signals (e.g., audio signals, video signals, both audio and video signals, and/or other types of signals) may be communicated between the PDMSP device and the microprocessor 45 of the docking assembly 10 by way of the at least one electrical coupling 12. The microprocessor 45 preferably communicates with a video processor 46, a digital signal processor 48, and an amplifier 49. In turn, the video processor 46 is communicatively coupled to at least one video port 32 and preferably at least one audio/video port 33 coupleable to the audio/video reproduction system 2. The digital signal processor 48 (which may be used, for example, to add equalization and/or sound field effects to an audio signal stream) communicates an audio stream to the amplifier 49 (internal to the docking assembly 10) adapted to adjust the output level of the audio signal to at least one audio port 30 and the audio portion of at least one audio/video port 33 coupleable to the audio/video reproduction system 2. The output signal level of the amplifier 49 is preferably responsive to a volume input signal, such as may be received via the wireless remote receiver 14 from the wireless remote controller 50, or received via the local user controls 17 (if provided). Various digital-to-analog signal converters (not shown) may be integrated into any of the video processor 46, digital signal processor 48, and microprocessor 45, or provided downstream of such components, if desired to generate analog output signals from the digital media signal provided by the PDMSP device 80. The microprocessor 45 and/or video processor 46 may further be used to provide video format conversion utility (e.g., from non-television-compatible formats to television-compatible formats) and to generate any desirable visual output signals (e.g., still images, video images, and/or computer generated display applications such as screensavers, skins, and other visualizations, whether or not synchronized or responsive to audio playback) during the playback of a digital audio file stored in a docked PDMSP device 80.

Each of the digital signal processor 48 and video processor 46 may include general-purpose or specialty microprocessor chips. While FIG. 1 illustrates the microprocessor 45 as intermediately disposed in communication between the PDMSP device 80 on the one hand and the video processor 46, digital signal processor 48, and amplifier 49 on the other, it is to be appreciated that communication paths independent of the microprocessor 45 (but preferably switchably controlled by the microprocessor) may be provided between the PDMSP device 80 and any of the video processor 46, digital signal processor, and amplifier 49, if desired. Alternatively, any of the video processor 46 and the digital signal processor 48 may be integrated, in whole or in part, with the (central) microprocessor 45. The video processor 46 preferably has an associated frame buffer adapted to store an image to be transmitted to the at least one video port 32 and/or the at least one audio/video port 33 for transmission to the audio and video reproduction system 2.

A PDMSP device 80 may communicate, through an interface connector (e.g., the connector 190 illustrated in FIG. 2B), various types of signals to an accessory device, such as the docking assembly 10. Examples of such signal types may include, for example: (a) signals indicative of menu contents; (b) signals containing digital media file or digital media file key identifiers; (c) digital media file content; (d) control signals; (e) status signals, and so on. Such signals are typically not communicated through the interface connector by the PDMSP device 80 in a television-compatible form. As noted previously, signals communicated within the PDMSP device 80 for display by the first display element 82 are typically formatted for a special purpose first display element 82, and not for a television-compatible display element. Desirable functions of the microprocessor 45 and/or video processor 46 within the docking assembly 10 include processing signals received from the PDMSP device 80 to yield television compatible (e.g., NTSC, PAL, various conventional high definition television formats, or equivalent signal standards) signals communicable to a television-compatible display element 5 through the at least one video port 32 and/or at least one audio/video port 33. This may be accomplished, for example, by developing television-compatible display menus, storing the same within the docking assembly 10 (e.g., in the memory element 44), populating the display menus with digital signal data received from the PDMSP device 80, and providing the populated display menus as a television-compatible signal to the at least one video port 32 and the at least one audio-video port 33. With the PDMSP device 80 adapted to display an aggregate first set of information with first display element 82 when the device 80 is in use, the docking assembly 10 (including the video processor 46) is preferably adapted to generate a substantially complete replicate of the first set of information on the television-compatible display element 5 when the PDMSP device 80 is docked with the docking assembly 10. For example, the docking assembly 10 and video processor 46 are preferably adapted to output a television-compatible video signal containing any of the following: (1) count of any of playlists, artists, albums, genre, songs, and composers; (2) names of any of playlists, artists, albums, genre, songs, and composers; (3) current play status embodying any of song length, song position, and play/pause/stop status; and (4) current song status embodying any of song name, artist name, and album name.

Figure 9A:
FIG. 9A is a first screen shot taken from a television-compatible display element receiving a signal from a docking assembly according to the present invention and having a portable digital media storage device docked thereto, the first screen shot showing a welcome menu in a central right portion of the screen.
Figure 9B:
FIG. 9B is a second screen shot taken from a television-compatible display element receiving a signal from a docking assembly according to the present invention and having a portable digital media storage device docked thereto, the second screen shot showing a digital media file artist name, song title, album name, song play position, and song length information in an upper portion of the screen, and a settings menu in a central right portion of the screen.
Figure 9C:
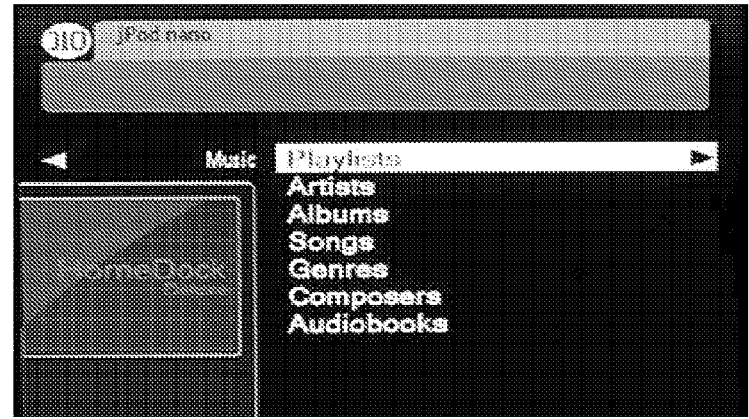
FIG. 9C is a third screen shot taken from a television-compatible display element receiving a signal from a docking assembly according to the present invention and having a portable digital media storage device docket thereto, the third screen shot showing a music menu (inclusive of playlists, artists, albums, songs, genres, composers, and songbooks submenus) in a central right portion of the screen.

Screen shots taken from a television-compatible display element showing populated menus output from a docking assembly according to the present invention and having a PDMSP device communicatively docked thereto are provided in FIGS. 9A-9C. The first screen shot depicted in FIG. 9A shows a welcome menu in a central right portion of the screen, listing the following user-selectable options: Menu, Shuffle Songs, Playlists, and HomeDock® Settings. It is noted that "HomeDock," "HomeDock Deluxe," and "DLO," as depicted in FIG. 9A, are trademarks of Netalog, Inc. (Durham, N.C.). The second screen shot depicted in FIG. 9B shows a digital media file artist name, song title, album name, song play position, and song length information in an upper portion of the screen, and a settings menu in a central right port of the screen. The setting menu includes the following user-selectable options: Color Themes, Screen Savers, Screen Saver Time, and About HomeDock. The third screen shot depicted in FIG. 9C shows a music menu in a central right portion of the screen, with the music menus including the following user-selectable options: Playlists, Artists, Albums, Songs, Genres, Composers, and Songbooks. In each instance, the user-selectable options are selectable with a remote controller device, such as the devices 50, 150 described herein. The screen shots depicted in FIGS. 9A-9C are merely illustrative of certain menus according to one embodiment of the invention. Various other menus and displays of static or dynamic information may be provided. In one embodiment, at least a portion of a television-compatible display element 5 displays visual media such as album art, music videos, visualization patterns (whether or not synchronized to music playback), digital skins, or other user-selected images or videos simultaneous with playback of digital music from a PDMSP device (e.g., PDMSP device 80 or 180) docked with the docking assembly (e.g., docking assembly 10 or 210). Such visual media may be stored on the PDMSP device itself, stored in a memory 44 associated with the docking assembly 10, or automatically retrieved over a network (e.g., network 19 or 40) upon initiation of playback of an audio file. In one embodiment, the displayable visual media includes a list of digital media files selectable for retrieval or download, such as for a fee. In further embodiments, the displayable visual media may include other subscription-based media, commercial programming, or commercial (e.g., product or service) offerings.

In certain embodiment, the docking assembly 10 may include an integral wireless network transceiver 19 adapted for communicating with a wireless network 41 that may be connectable to the Internet and/or World Wide Web. The wireless network 41 may include a wireless local area network (WLAN), such as an IEEE 802.16-compliant (Wi-Max) network, IEEE 802.11-complaint (Wi-Fi) network, an IEEE 802.15.1-compliant (Bluetooth) network, or similar or equivalent networks, such as to permit free or paid transfer of digital media files, digital media file keys, and the like, between a network and the PDMSP device 80 docked with the docking assembly 10, or between a network and a memory element 44 (e.g., a NAND or other flash memory) associated with the docking assembly 10. Such a network 41 may further include capability to stream stored digital media content played by the PDMSP device 80 (i.e., when docked to the docking assembly 10) over the network 41 to a network-connectable remote device (not shown) having an associated audio and/or video reproduction system. For example, a PDMSP device 80 may be docked with the docking assembly 10 in a first location in a first room within a particular facility (e.g., a home or office) having a first audio and video reproduction system receiving media content from the PDMSP device via the audio and/or video ports 30, 32, 33 locally disposed at the docking assembly 10, while media content is simultaneously broadcast via the wireless network transceiver 19 and the network 41 to an appropriate receiving device (not shown) disposed in a second room of the facility, outside the facility, or even in a remote facility, for reproduction via a second audio and video reproduction system (not shown). The docking assembly 10 may include an internal or external antenna (not shown) adapted for use with the wireless network transceiver 19. As an alternative to including an integral wireless transceiver 19, the wired network port 25 may be adapted to connect with a separate wireless transceiver (not shown) providing the same or equivalent wireless communication capability.

At least one video signal output from the docking assembly 10 is preferably digital, although digital-to-analog signal conversion may be performed as part of processing video signals as appropriate to the desired output format. Audio signals emanating from the PDMSP device 80, whether such signals are in substantially unaltered or processed (e.g., by way of the digital signal processor 48 and/or any digital-to-analog converters) form, are further communicated to the at least one audio port 30 and the at least one audio/video port 33.

Each of the at least one audio port 30, the at least one video port 32, and the at least one audio/video port 33 preferably includes multiple connectors to provide an appropriate level of fidelity and compatibility with various external devices in a given user's audio and video reproduction system 2. Examples of suitable connectors include, but are not limited to, fiber optic connectors, coaxial connectors, RG-6 coaxial connectors, RCA plug connectors, S-video connectors, composite video connectors, Digital Visual Interface (DVI) connectors, High Definition Multimedia Interface (HDMI™) connectors, SCART connectors, Unified Display Interface connectors, and DisplayPort connectors. Audio and video signals may be conveyed via discrete connectors, or integrated into multi-function connectors (e.g., High Definition Multimedia Interface), as desired. Multiple connectors may be enabled simultaneously, such as to permit multiple audio amplifiers 4 and multiple television compatible display elements 5 to receive signals simultaneously from PDMSP device 80 via the docking assembly 10. In one embodiment, an audio output port is adapted to communicate a line-level analog signal to the external audio amplifier 4.

Figure 5:
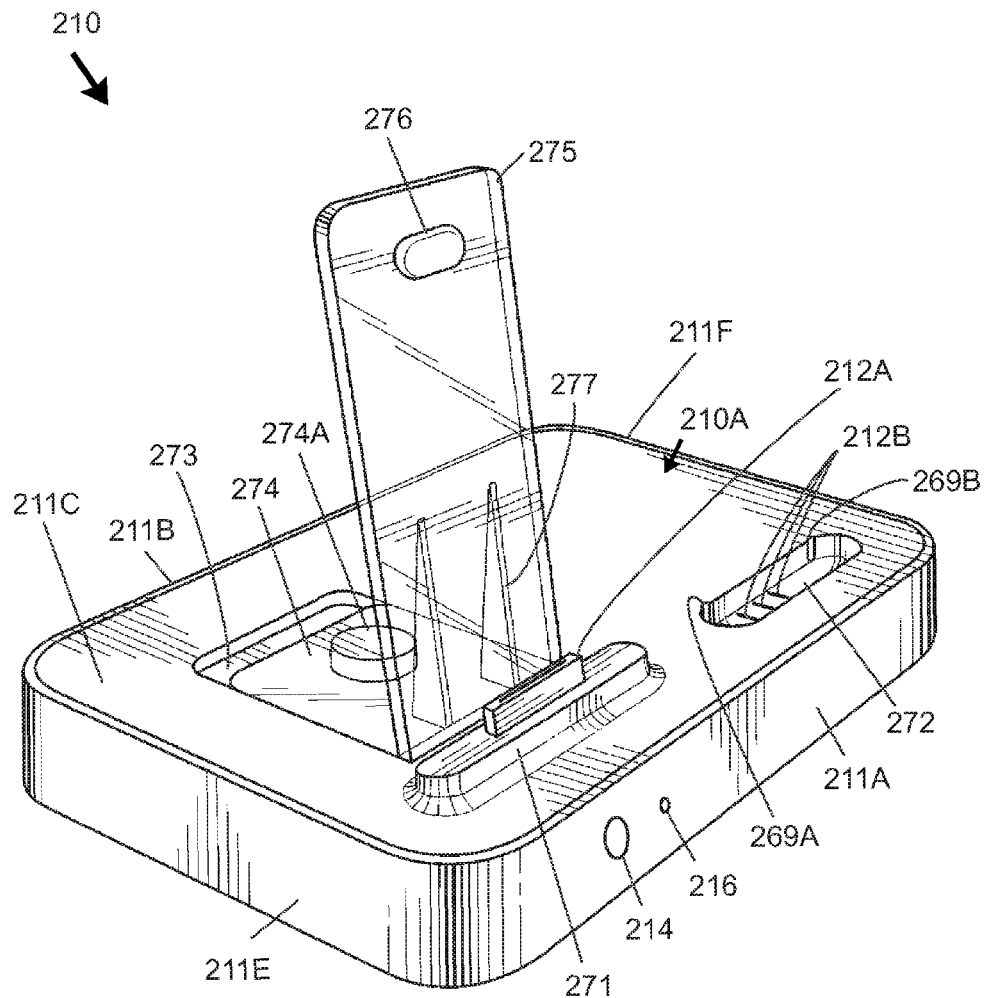
FIG. 5 is a perspective view of a docking assembly controllable via a wireless remote controller (such as the controller of FIGS. 4A-4B) and adapted for use in interfacing a portable digital media storage and playback device (such as the portable digital media storage and playback device of FIGS. 2A-2B) with an audio and video reproduction system having a television-compatible display element.

Two views of a telephonic PDMSP device 180 are illustrated in FIGS. 2A-2B. The term "telephonic" in this context refers to the ability of the device 180 to execute any of various conventional portable telephone functions such as sending or receiving telephone calls, sending or receiving data such as email or text messages, connecting to wireless data networks, and the like. The PDMSP device 180 includes a first display element 182, such as a LCD display, a speaker 186, a microphone 188, and various controls 183, 184, 185A-185D, 188, 189. Such controls 183, 184, 185A-185D, 188, 189 may include, for example, a scroll wheel 183 or similar versatile multi-position element, a 'select' button 184, a 'menu' button 185A, a 'return or previous file' button 185B, an 'advance or next file' button, a play/pause button 185D, and a standard 12-button telephonic keypad 189. If desired, the display 182 may comprise a touch-screen display to provide further user input utility. The telephonic PDMSP device 180 further includes a connector port 190 for receiving an appropriate electrical coupling connector adapted for charging and/or signal transmission, such as the at least one electrical coupling 12 associated with the docking assembly 10 (or the electrical coupling 212A associated with the docking assembly 210A as illustrated in FIG. 5). The telephonic PDMSP device 180 preferably includes other components (not illustrated herewith) typically provided in either conventional standard telephonic devices and/or conventional digital media storage and playback devices, such as a battery, a microprocessor, a telephone transceiver, an antenna, a memory, and the like. The telephonic PDMSP device 180 is preferably adapted to send and/or receive portable digital media files via a telephonic data network.

FIG. 3 provides a schematic view of a wireless remote controller device 150 for use with a docking assembly (e.g., docking assembly 10 illustrated in FIG. 1, or assembly 210 illustrated in FIGS. 5-7) adapted to receive a telephonic PDMSP device (such as the telephonic PDMSP device 180 illustrated in FIG. 5), with the remote controller device 150 including telephonic relay utility and remote control utility to enhance the functionality of the telephonic PDMSP device 180. The remote controller device 150 preferably includes a microprocessor 155 having an associated memory 164 and adapted to execute a pre-defined instruction set. The remote controller device 150 includes a battery 151 (or equivalent charge storage element) suitable to supply electrical power to various power-consuming elements within the device 150. A charging element 163 preferably includes at least one electrical contact (such as the contacts 162 shown in FIG. 4B for mating with corresponding contacts of a docking assembly) and any suitable electrical circuit element(s) to furnish power at appropriate levels to charge the battery 151 and/or to power directly any of various power-consuming elements within the controller 150. The charging element 163 is perfectly controlled by the microprocessor 155, and a temperature sensor 161A may be provided to provide a thermal feedback signal in order to avoid overcharging. A current sensing element (not shown) is preferably provided to further monitor current supplied to the battery 151 or any other element within the device 150 to minimize excess current or overcharging. As illustrated, the remote controller 150 includes raised portions 169A, 169B along a rear surface thereof to register with corresponding lateral recess portions 269A, 269B disposed along one edge of a cavity or recess 272 in a docking assembly 210 (as illustrated in FIG. 5) and adapted to receive the remote controller 150.

To provide telephonic relay utility, the remote controller device 150 may include an integrated telephone relay transceiver 158 (or, alternatively, a telephone relay transmitter and a separate telephone relay receiver), a speaker 166, and a microphone 168. Audio input/output functions may be managed by an audio input/output element 160 interposed between the telephonic transceiver 158 and the speaker 166 and microphone. An audio amplifier 167 is preferably associated with the speaker 166 to provide an appropriate audio output level. The telephone relay transceiver 158 is preferably adapted to communicate with a wireless telephone transceiver (e.g., the telephone transceiver 18 illustrated in FIG. 1) associated with a docking assembly 10 (as illustrated in FIG. 1).

To provide remote control utility, the remote control device 150 includes a remote control transmitter 154 preferably having a microprocessor and various user inputs 157 (such as buttons, touch screens, scroll wheel elements, or the like) in communication with the microprocessor 155 to control remote control and/or telephone functions. A speech recognition element 161, preferably in communication with the microprocessor 155 and memory 164, may be provided to recognize vocal inputs and generate command signals transmissible to the docking assembly 10 either via the remote control transmitter 10 or the telephone transceiver 158. The speech recognition element 161 preferably includes a processor and a software routine operable with the processor and a memory (e.g., the memory element 164). If desired, the speech recognition element may be substantially integrated into the microprocessor 155. In an alternative embodiment, the speech recognition element 161 may be provided in a docking assembly (e.g., the docking assembly 10 illustrated in FIG. 1) rather than provided in the remote controller 150, such that voice signals are communicated from the telephonic remote controller 150 to the docking assembly and then analyzed in the docking assembly to recognize specific vocal inputs and generate appropriate command signals.

The remote controller 150 preferably includes an integrated display 152 and an associated backlight 152A. Such display may be used for various functions, including: display of caller identification signals; display of a video portion of a video telephony signal; providing visible incoming or received communication notification; providing text data; and providing visible indication or identification of any of: input signals (e.g., telephone numbers or remote control commands) entered by a user, call time, signal strength, battery life, telephone mode, telephone settings, controller mode, controller settings, calls missed, calls received, calls made, contact information, accumulated monetary charges (e.g., for telephone use or digital media purchases), debits remaining, diagnostic signals, and so on.

The remote controller 150 may further include an interface element 159, preferably including a connector adapted to mate with at least one electrical coupling 12 of the docking assembly 10, or to mate with an external device such as a personal computer (not shown) to permit programmatic updates of software associated with the remote controller 150, or to permit troubleshooting. In one embodiment, the interface element 159 is adapted to engage a connector associated with a video game controller device (not shown), such as a gamepad or joystick, to facilitate wireless control of a video game stored in a PDMSP device, with audio and video reproduction of the game play being provided through an audio and video reproduction system (e.g., the system 2 illustrated in FIG. 1) communicatively coupled to the docking assembly. In one embodiment, the interface element 159 includes a USB connector. The interface element 159 may further include any necessary circuitry to enable communication with the microprocessor 155 (or any other appropriate internal element) of the remote controller 150.

In another embodiment utilizing a telephonic remote controller 150, a docking assembly 10 (as illustrated in FIG. 1) receives a telephonic signal (e.g., a conventional telephone signal or Voice Over Internet Protocol telephonic signal) independent of any PDMSP device, via any of the wireless network transceiver 19, the network port 24, or a wired telephone input port (not shown) operable with a conventional telephone line, and the telephonic remote controller 150 is adapted to receive such telephonic signal and provide a compatible output signal. In this manner, the telephonic remote controller 150 may serve as a multi-line telephone transceiver in communicating telephonically with one telephone signal routed through a telephonic PDMSP device (e.g., PDMSP device 180) to function as a telephone relay receiver, and in communicating telephonically with another telephone signal made available to the docking assembly 10 to function as a conventional cordless telephone. Incoming communication signals may be routed automatically to the remote controller 150. In case one communication is in progress and an incoming communication signal is received, switching between telephone lines may be performed via the remote controller 150 with any of the user inputs 157 (e.g., inputs 157A-157I illustrated in FIG. 4A).

Front and bottom external views of a telephonic remote controller device 150 according to one embodiment are illustrated in FIGS. 4A-4B, respectively. The remote controller device 150 includes a display element 152 (e.g., a LCD or LED display) suitable for displaying alphanumeric characters. In another embodiment (not shown), a display element adapted to further display still or video images in addition to alphanumeric characters may be provided. The remote controller device 150 includes a speaker 166 and a microphone or speech transducer 168. An LED 156, such as a multi-color LED, is preferably provided for communication (e.g., incoming call) notification. Vibratory communication notification may be provided via a vibratory element (not shown) within the remote controller 150. A twelve-key telephonic keypad 157X is preferably provided to readily permit telephone dialing and text messaging, if desired. The keypad 157X is preferably also enabled for remote control of an associated docking assembly for a PDMSP device. Various additional control keys 157A-157I are preferably provided to control various functions associated with the docking assembly, docked PDMSP device, associated network (e.g., to select digital media files and authorize their purchase or download by the user), and/or components associated with the audio and video reproduction system 2. Such controllable functions may include, without limitation, the following illustrative examples: media source, media identification, playlist identification, media selection, playback speed, playback volume, operating mode, output mode, telephone operation, and so on. Various functions may be controlled with the aid of "on screen" menus displayable on the local display 152 and/or (more preferably), menus displayable on the television-compatible second display element 5.

Figure 6:
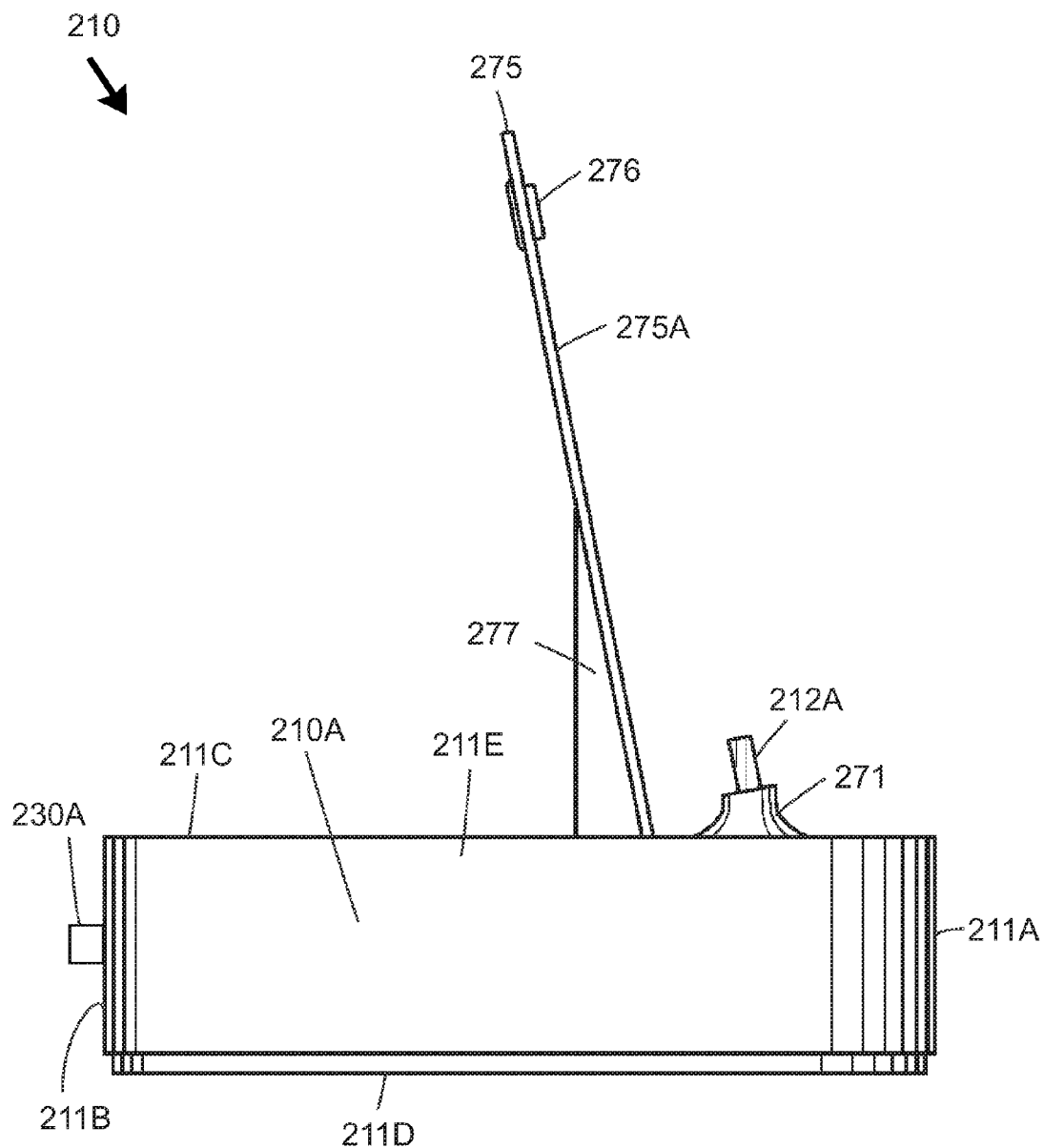
FIG. 6 is a left side elevation view of the docking assembly of FIG. 5.

FIGS. 5-6 provide perspective and side elevation views, respectively, of a docking assembly 210 operable with the PDMSP device 180 of FIGS. 2A-2B and the telephonic remote controller device 150 of FIGS. 4A-4B. The docking assembly 210 may include any of the various elements illustrated and described previously herein in connection with the docking assembly 10 illustrated in FIG. 1. The docking assembly 210 includes a unitary body structure 210A having a front surface 211A, back surface 211B, top surface 211C, bottom surface 211D, and side surfaces 211E, 211F. A wireless remote receiver 214 is preferably disposed on the front surface 211A of the body structure 210A to facilitate unobstructed communication with the wireless remote controller 150. Further disposed on the front surface 211A is at least one LED 216 to provide a user with visible indication of events such as power on, signal received, docking status, and so on. The at least one LED 216 may include at least one multicolor LED to communicate various information based on output color, and/or a plurality of different LEDs. Various ports (e.g., audio port 230A) are preferably provided on the back surface 211B to minimize the outward appearance of clutter, assuming that the front surface 211A is facing forward.

The docking assembly 210 includes a raised surface portion 271 having an upwardly-protruding electrical coupling 212A adapted to mate with an associated connector 190 of a PDMSP device 180 (such as illustrated in FIG. 2B). Each of the coupling 212A and connector 190 preferably includes a plurality of electrical contacts, sufficient to communicate power or charging current and low-power signals, such as command signals and signals representative of digital media content. Disposed behind the raised surface portion 271 is a reclined support element 275 having corner braces 277 to promote structural rigidity. The front-to-back position of the support element 275 may be adjusted by sliding a horizontal portion 274 of the support element 275 within a recess or track 273 and actuating a set screw 274A to lock the support element 275 in a desired position. The support element 275, or at least a front surface 275A thereof, preferably includes a non-slip cushion element 276, such as may be fabricated of silicon rubber or another suitable non-slip material. Providing the coupling 212A on a raised surface portion 271 adjacent to the adjustable support element 275 permits the fixed coupling 212 to work with a variety of PDMSP devices of various sizes and in (e.g., thicknesses) so long as each PDMSP device has a connector 190 compatible with the coupling 212. In an alternative embodiment, the coupling 212A may be disposed substantially within a recess (not shown) that is substituted for the raised surface portion 271 and is adapted to receive and retain a PDMSP device.

The docking assembly 210 further includes a recess 272 adapted to receive at least a portion of the wireless remote controller 150 illustrated in FIGS. 4A-4B. Disposed along a bottom surface of the recess are electrical contacts 212B, such as may be used to communicate powering or charging current to the remote controller 150 via corresponding contacts 162 disposed along a bottom surface of the controller 150. The recess 272 may further include a multi-contact electrical coupling (not shown) adapted to mate with the connector 159 of the remote controller device 150 to exchange communication signals (e.g., for troubleshooting, reprogramming, frequency synchronization, or other desirable functions) between the remote controller 150 and the docking assembly 210 when the remote controller 150 is docked thereto. The recess 272 further includes lateral recess portions 269A, 269B disposed along a rear edge of the recess 272, with such lateral recess portions 269A, 269B adapted to receive corresponding raised portions 169A, 169B of the remote controller 150 to prevent misinsertion of the remote controller 150 into the recess 270.

FIG. 7 provides a front view of the docking assembly 210 of FIGS. 5-6 having docked thereto the portable digital media storage and playback device 180 of FIGS. 2A-2B and the telephonic remote controller device 150 of FIGS. 4A-4B. When docked to the docking assembly 210, a battery (e.g., battery 151 illustrated in FIG. 3) associated with the remote controller 150 is preferably charged via the passage of electrical current through the charging element 163 as received from the mated contacts 162, 212B. Likewise, when docked to the assembly 210, the PDMSP device 180 preferably receives electrical current to power the device 180 and/or charge an associated PDMSP device battery 81 (as illustrated in FIG. 1) In operation of the docking assembly 210 with docked PDMSP device 180, the remote controller device 150 is separated from the assembly and used to wirelessly control any of various functions (e.g., associated with the docking assembly 210, PDMSP device 180, and/or an audio and video reproduction system 2 as illustrated in FIG. 1), to provide telephonic relay or primary telephonic utility, or to provide any other functionality as described herein.

One way to ensure or regulate interoperability between an accessory device (such as a multi-function docking assembly) and a PDMSP device is through the use of authentication technology. In a preferred embodiment, a docking assembly and a PDMSP device each include an authentication element, such as an integrated circuit, adapted to communicate with one another to execute an authentication scheme employed at least the first time that the accessory device is connected to the PDMSP device, with successful authentication being a prerequisite for the transfer of any substantive content or control signals between the PDMSP and the accessory device. Preferably, a challenge and response-based authentication scheme is employed.

Examples of integrated circuits that may be used to provide or easily adapted to provide such functionality include: the Texas Instruments BQ26150-family of ICs (including models BQ26150DCKR and BQ26150DCKRG4) (Texas Instruments Inc., Dallas, Tex.); the Dallas Semiconductor/Maxim DS2703-family of ICs (including models DS2703U and DS2703U+)(Maxim Integrated Products, Sunnyvale, Calif.); and the Intersil ISL6296 family of ICs (Intersil Corp., Milpitas, Calif.).

FIG. 8 provides a block diagram of a preferred coupled combination of a PDMSP device 380 and a remotely controllable docking assembly 310 adapted to provide authentication utility. The docking assembly 310 includes at least one electrical interface coupling (e.g., coupling 12 illustrated in FIG. 1) that mates with a corresponding at least one electrical connector (e.g., connector 190 illustrated in FIG. 2B) associated with the PDMSP device.

A PDMSP device (such as the devices 80, 180 described hereinabove) preferably includes a central processing unit (CPU), such as a complex instruction set computer microcontroller (not shown) that interfaces with various other components, various user input elements, and a data storage element (not shown) typically including any of a rotating disc (hard drive or microdrive) and flash memory to store various media files in addition to other data files and/or executable programs. An authentication element, such as an authentication integrated circuit, is preferably communicatively coupled with the connector 190 (as shown in FIG. 2B), whether directly or through the CPU. If desired, an authentication element may be integrated with the CPU of a PDMSP device. Such an authentication element may be used to authenticate (e.g., validate to enable communication or other interoperability) an accessory device such as a docking assembly for use with the PDMSP device.

Preferably, an authorization element comprises an integrated circuit and a memory, with the memory preferably including both a public memory for storing unencrypted communicable information and secret or encrypted information. An authorization element is preferably reprogrammable, such as by way of connection to a data exchange connector (e.g., connectors 159 or 190 as described hereinabove) that may be linked to an appropriate device such as a personal computer or PDA to accomplish reprogramming functions if desired. Such reprogramming utility may be desirable, for example, to enable use of a docking assembly with newly released or updated PDMSP devices having potentially new and different authentication data or authentication schemes.

FIG. 8 provides a functional block diagram for a basic challenge and response-based authentication scheme that may be utilized by and between a remote controlled docking assembly 310 and a PDMSP device 380, each having an associated authentication element 313, 395. In a basic challenge and response scheme, the "host" or "challenger" (e.g., authentication element 395 associated with the PDMSP device 410) sends a random challenge to the "responder" (e.g., authentication element 313 associated with the docking assembly 310) upon initial connection between the two. A random challenge may consist of a number of bits of random data generated by the host. Each authentication element 313, 395 preferably includes a memory for storing certain authentication information, with the memory of at least the docking assembly authentication element 313 preferably being reprogrammable. The memory of each authentication element 313, 395 preferably includes both a private memory (e.g., for including unencrypted information and/or a secret key that is preferably not subject to transmission) and a public memory (e.g., for including encrypted information and/or a public key, unique device ID, or other less sensitive information). Using stored information, the responder 313 processes the host-transmitted challenge information (e.g., by performing an authentication transform or computation, preferably utilizing the secret key or some information derived therefrom such as a public key) to produce a response string for transmission back to the host 395. On the other side, the host 395 performs the same authentication transform using stored information, or some combination of stored information and information communicated by the responder (e.g., an encrypted key passed by the responder 313). The result compares the transform value computed by the host 395 against the response (transform value) obtained from the responder 313. If the calculated data from the responder matches the answer calculated by the host, then the host authenticates the responder and allows the PDMSP device and the accessory device to start operation and/or substantive communication. Otherwise, the authentication fails, and the authentication element (either alone or in with the aid of a microprocessor) may inhibit operation of the interconnected PDMSP device 380 and docking assembly 310 and provide a warning signal to the user, e.g., through a display element associated with the PDMSP device 380, through a display element connected with the docking assembly 310, and/or a LED (not shown) provided on the docking assembly 310.

In one embodiment, a challenge-and-response authentication scheme may utilize cyclic redundancy check (CRC) in an authentication transform. Challenges and keys of various bit lengths may be used. In one embodiment, a 32-bit random challenge and 96-bit secret ID are used in conjunction with a random polynomial and 16-bit seed value to generate a 16-bit CRC response. A unique CRC polynomial, CRC seed, and device ID value may be used in each device. Such values may be stored as encrypted text in public memory and unencrypted (plain) text in private memory, such that only a host system can decrypt the polynomial, seed, and ID values using a stored secret key. To authenticate a responder, the host reads the encrypted device ID, polynomial, and seed values from public memory, decrypts these values using a secret key, and then generates a (e.g., 32-bit) random challenge. The random challenge is transmitted to the responder, which uses challenge information from the host along with the plain-text version of polynomial coefficients, seed, and device ID to calculate the authentication CRC value. The host uses the polynomial coefficients, seed, and device ID that it decrypted, along with the random challenge that it sent to the responder to calculate the authentication CRC value. The responder authentication CRC value may be transmitted back to the host where the two authentication CRC values are compared, with a match serving to authenticate the responder and initiate system operation and/or substantive communication.

In another embodiment, a challenge-and-response authentication scheme may utilize an iterative hashing algorithm such as the SHA-1/HMAC secure hash algorithm, which has been widely used for authentication of Internet transactions. The authentication method is similar to a CRC-based scheme except it utilizes a different algorithm. The host reads a (e.g., 128-bit) encrypted device ID from the public memory and decrypts those values using the secret key to yield plain-text information with root keys. Then it generates a (e.g., 160-bit) random challenge that is transmitted to the responder, which uses the plain-text version of the ID along with the random challenge to calculate an authentication digest value. The host uses the decrypted ID and the same random challenge to calculate its own authentication digest value. When both digest values have been calculated, the host reads the authentication digest value from the responder and compares that value to its own authentication digest value. If a match is obtained, then the responder is authenticated and system operation and/or substantive communication may be initiated.

In one embodiment, an authentication element employs the Secure Hash Algorithm (SHA-1) specified in the Federal Information Processing Standards Publication Numbers 180-1 and 180-2, and ISO/IEC 10118-3. An authentication IC embedded in the accessory device processes a host transmitted challenge using a stored secret key and unique ROM ID to produce a response word for transmission back to the host. The secret key is securely stored on-chip and never transmitted between the battery and the host. If each of the secret key and the ROM ID includes 64 bits, then in a preferred embodiment the response may include 160 bits.

Remotely controllable docking assemblies as described herein for use with PDMSP devices enable various novel methods, including, for example, methods for downloading or otherwise obtaining digital media, and methods for creating or modifying digital media playlists.

In one embodiment, digital media files or digital media file keys may be downloaded or transferred using a remotely controlled docking assembly as described herein to which a PDMSP device is docked. The term "digital media file key" as used herein refers to any code, script, data file, or the like adapted to make readable (whether temporarily or permanently) an otherwise unreadable (e.g., encrypted) digital media file. For example, a digital media file including copyrighted content may be encrypted by the creator or distributor to deter copying, with digital media file keys being distributed to consumers for a subscription or other fee to enable encrypted digital media files to be read. Such a scheme employing digital media file keys is amenable to rapid or frequent updates by the copyright holder to better maintain control over copyrighted works. Furthermore, it permits encrypted files to be distributed via a variety of sources, such as the Internet and/or other networks, to maximize availability to potential buyers, and enables encrypted files to be cached in local high-speed data repositories to facilitate rapid user downloads.

FIG. 10 provides a flowchart of a method for selecting and downloading digital media files or digital media file keys employing a remotely controllable docking assembly as described herein and a PDMSP device docked thereto. The method 400 includes multiple illustrative steps. A first step 402 includes communicatively coupling, via a remotely controllable docking assembly, a portable digital media storage and playback device having a first display element with an audio and video reproduction system having a television-compatible second display element. A second step 404 includes establishing a connection to a media source such as a network (e.g., the Internet, World Wide Web, digital cable (television) network, telephonic network, or other media network). A third step 406 includes displaying on the second display element information indicative of at least one digital media file and/or digital media file key obtainable from the media source. Such information may include title, artist, producer, label, distributor, genre, cost information, and the like. A fourth step 408 includes selecting, using the remote controller (preferably a wireless remote controller, although a wired remote controller may be used), a digital media file and/or digital media file key for download or transfer to the portable digital media storage and playback device. A fifth step 410 includes authorizing a financial obligation or financial transfer using the remote controller, in exchange for download or transfer of a digital media file and/or digital media file key. Such step may include initiating communication of confidential information, such as information enabling billing to or debiting from a financial or commercial account. An optional intermediate step includes utilizing the remote controller to initiate previewing (i.e., playback) of one or more portions of a digital media file on the audio and video reproduction system communicatively coupled to the docking assembly prior to the purchase authorization step. In another embodiment, the user can employ the remotely controlled docking assembly to initiate transfer of a digital media file from the docked PDMSP device to a remote device via a network. Digital media files subject to download or transfer according to the foregoing method steps include audio files, image files, video files, text files, skins, interactive games, and the like. Utilizing a docking assembly and remote controller as described herein and employing the foregoing method steps, a user can download or otherwise transfer digital media files to and from a PDMSP device without requiring a personal computer as the primary PDMSP device interface.

FIG. 11 provides a flowchart of a method for creating or modifying playlists for use with a PDMSP device utilizing a remotely controlled docking assembly as described herein. The method 450 includes multiple illustrative steps. A first step 452 includes communicatively coupling, via a remotely controllable docking assembly, a portable digital media storage and playback device having a first display element with an audio and video reproduction system having a television-compatible second display element. A second step 454 includes creating or retrieving a playlist using a remote controller (preferably a wireless remote controller, although a wired remote controller may be used), with information indicative of the created or retrieved playlist displayed on the second display element. A third step 456 includes displaying information indicative of at least one digital media file stored on the portable digital media storage and playback device on the second display element. A fourth step 458 includes selecting for addition to or deletion from the created or retrieved playlist the at least one digital media file using the remote controller. A fifth step 460 includes selecting for storage on the portable digital media storage and playback device and/or a memory associated with the remotely controllable docking assembly the modified playlist. In this manner, a user can manage playlists in comfort without requiring a personal computer as a primary interface for the PDMSP device.

Remotely controllable docking assemblies as described herein for PDMSP devices thus provide substantial utility to users by expanding the entertainment capabilities of PDMSP devices beyond personal enjoyment, and minimize the need to rely on a personal computer for primary PDMSP device interface.

While the invention has been described herein with respect to various illustrative aspects, features and embodiments, it will be recognized that the invention is not thus limited, but that the present invention extends to and encompasses other features, modifications, and alternative embodiments, as will readily suggest themselves to those of ordinary skill in the art based on the disclosure and illustrative teachings herein. The claims that follow are therefore to be construed and interpreted as including all such features, modifications and alternative embodiments, within their spirit and scope.

What is claimed is:

1. A docking assembly adapted for use in interfacing a portable digital media storage and playback device having a first display element with an audio and video reproduction system having a television-compatible second display element and a first audio amplifier adapted to drive at least one speaker, the docking assembly comprising:
   a first electrical coupling adapted to engage the portable digital media storage and playback device;
   a microprocessor adapted to communicate with the portable digital media storage and playback device through the first electrical coupling;
   a remote control receiver adapted to receive an input signal from a wireless remote controller device and to provide an output signal to the microprocessor;
   a second electrical coupling adapted to engage the wireless remote controller device;
   an audio output port adapted to communicate an audio signal to the first audio amplifier;
   a video output port adapted to communicate a television-compatible video signal to the second display element;
   a video processor in communication with the microprocessor, the video processor being adapted to communicate to the video output port the television-compatible video signal indicative of a signal received from the portable digital media storage and playback device for display by the second display element; and
   a unitary body structure, wherein the first electrical coupling, the second electrical coupling, the microprocessor, the audio output port, the video output port, and the video processor are disposed in or on the unitary body structure,
   wherein the unitary body structure defines a first cavity and a second cavity, the first cavity including the first electrical coupling and being adapted to receive a portion of the portable digital media storage and playback device, and the second cavity including the second electrical coupling and being adapted to receive a portion of the wireless remote controller device, and
   wherein the wireless remote controller device includes a connector configured to mate with the second electrical coupling of the docking assembly to receive programmatic updates of software associated with the wireless remote controller, the connector being further configured to mate with a control device to provide wireless control of video content stored in the portable digital media storage and playback device and to provide wireless control of an audio and video reproduction of the content being provided through the audio and video reproduction system communicatively coupled to the docking assembly.

2. The docking assembly of claim 1, wherein the first display element is adapted to display an aggregate first set of information when the portable digital media storage and playback device is in use, and the video processor is adapted to generate a substantially complete replicate of the first set of information when the first electrical coupling engages the portable digital media storage and playback device.

3. The docking assembly of claim 1, wherein the video processor is adapted to communicate a video signal indicative of any of:

(1) count of any of playlists, artists, albums, genre, songs, and composers;
(2) names of any of playlists, artists, albums, genre, songs, and composers;
(3) current play status embodying any of song length, song position, and play/pause/stop status; and
(4) current song status embodying any of song name, artist name, and album name.

4. The docking assembly of claim 1, wherein the video processor is adapted to communicate a video signal embodying a still picture.

5. The docking assembly of claim 1, wherein the video processor is adapted to communicate a video signal embodying moving pictures.

6. The docking assembly of claim 1, wherein the video processor comprises a frame buffer adapted to store an image to be transmitted to the second display element.

7. The docking assembly of claim 1, wherein the video processor is integrated with the microprocessor.

8. The docking assembly of claim 1, wherein the audio output port is adapted to communicate a line-level analog signal to the first audio amplifier.

9. The docking assembly of claim 1, wherein the first audio amplifier has an associated digital to analog converter, and the audio output port is adapted to communicate a digital signal to the first audio amplifier.

10. The docking assembly of claim 1, further comprising a second amplifier in communication with the audio output port and adapted to amplify an audio signal received from the portable digital media storage and playback device, wherein the output level of the second amplifier is responsive to a volume input signal.

11. The docking assembly of claim 10, wherein the volume input signal is received by the remote control receiver from the wireless remote controller device.

12. The docking assembly of claim 1, wherein the television-compatible video signal comprises any of a NTSC signal and a PAL signal.

13. The docking assembly of claim 1, wherein the television-compatible video signal comprises a digital video signal.

14. The docking assembly of claim 1, wherein the television-compatible video signal comprises a high-definition video signal.

15. The docking assembly of claim 1, wherein the video output port comprises an S-video connector.

16. The docking assembly of claim 1, wherein the video output port comprises a plurality of composite video connectors.

17. The docking assembly of claim 1, wherein the video output port comprises a Digital Visual Interface-compatible connector.

18. The docking assembly of claim 1, wherein the video output port comprises a High-Definition Multimedia Interface-compatible connector.

19. The docking assembly of claim 1, wherein the video output port comprises a Unified Display Interface-compatible connector.

20. The docking assembly of claim 1, wherein the video output port comprises a DisplayPort-compatible connector.

21. The docking assembly of claim 1, further comprising a Universal Serial Bus port and a network interface port.

22. The docking assembly of claim 1, further comprising an authentication element configured to provide an authentication signal to the portable digital media storage and playback device and communicate with another authentication element of the portable digital media storage and playback device to execute an authentication scheme at least a first time that the portable digital media storage and playback device is solely and directly connected to the docking assembly so that only the portable digital media storage and playback device and the docking assembly are directly connected together for transfer of files between the portable digital media storage and playback device and the docking assembly when the authentication scheme is successful.

23. The docking assembly claim 22, wherein the authentication element comprises an integrated circuit.

24. The docking assembly of claim 23, wherein the authentication element comprises a memory.

25. The docking assembly of claim 24, wherein the memory comprises a public memory and a private memory.

26. The docking assembly of claim 23, wherein the authentication element is adapted to perform a challenge and response authentication scheme.

27. The docking assembly of claim 22, wherein the authentication signal is provided to the portable digital media storage and playback device through the electrical coupling.

28. The docking assembly of claim 22, wherein the authentication element is reprogrammable.

29. The docking assembly of claim 1, further comprising a camera interface port.

30. The docking assembly of claim 1, further comprising a serial interface port.

31. The docking assembly of claim 30, wherein the serial interface port is adapted to permit interconnection with any of a computer and a remotely controlled media device.

32. The docking assembly of claim 30, wherein the serial interface port comprises a RS-232 port.

33. The docking assembly of claim 1, further comprising a port adapted for wired connection to a wireless receiver disposed remotely from the unitary body structure.

34. The docking assembly of claim 1, further comprising a mode selector switch.

35. The docking assembly of claim 34, wherein the mode selector switch permits the user to select a desired video output format.

36. The docking assembly of claim 34, wherein the mode selector switch permits the user to select between any of audio and video output modes.

37. The docking assembly of claim 1, further comprising at least one electrical circuit element adapted to conduct power from an external power source to at least one of the first electrical coupling and the second electrical coupling.

38. The docking assembly of claim 37, wherein the docking assembly is adapted to perform simultaneously the functions of (1) powering the portable digital media storage and playback device, (2) charging a battery associated with the portable digital media storage and playback device, and (3) charging a battery associated with the wireless remote controller device through electrical contacts of the wireless remote controller device that contact electrical contacts of the docking assembly disposed in the second cavity when the wireless remote controller device is received by the second cavity, the docking assembly further comprising a temperature transducer configured to provide thermal feedback for regulating the charging of the battery associated with the portable digital media storage and playback device, and the charging of the battery associated with the wireless remote controller device.

39. The docking assembly of claim 38, wherein the wireless remote controller device includes a pair of protrusions protruding from a surface of the wireless remote controller device, and wherein the second cavity of the docking assembly includes lateral recess portions configured to receive the pair of protrusions.

40. The docking assembly of claim 1, further comprising an associated switching power supply adapted to receive alternating current and output direct current.

41. The docking assembly of claim 1, further comprising a support element protruding from the body structure and adapted to support at least one surface of the portable digital media storage and playback device when the portable digital media storage and playback device engages the first electrical coupling.

42. The docking assembly of claim 41, wherein the support element is user-adjustable.

43. The docking assembly of claim 1, wherein the first electrical coupling is adapted to engage the portable digital media storage and playback device when the portable digital media storage and playback device is received by the body.

44. The docking assembly of claim 1, wherein the remote control receiver is disposed in or on the unitary body structure.

45. The docking assembly of claim 1, further comprising a wireless network transceiver.

46. The docking assembly of claim 45, wherein the wireless network transceiver is compliant with any of IEEE 802.11, IEEE 802.16, and IEEE 802.15.1.

47. The docking assembly of claim 1, further comprising a telephone transceiver configured to rebroadcast telephonic signals between the wireless remote controller device and the portable digital media storage and playback device.

48. A kit comprising the docking assembly of claim 1 and the remote controller device.

49. An entertainment system comprising the kit of claim 48 and the audio and video reproduction system.

50. The entertainment system of claim 49, wherein the second display element comprises any of a television, a CRT monitor, a LCD monitor, a plasma monitor, a projection monitor, and a digital projector.

51. The entertainment system of claim 49, further comprising the portable digital media storage and playback device.

52. The docking assembly of claim 1, wherein the portable digital media storage and playback device comprises at least one of a hard disk and a removable flash memory.

53. A method for controlling a portable digital media storage and playback device having a first display element, comprising the acts of:
  docking the portable digital media storage and playback device in a first cavity of a docking assembly including a first electrical coupling;
  docking a wireless remote controller device of the docking assembly in a second cavity of the docking assembly including a second electrical coupling;
  controlling operation of the portable digital media storage and playback device with the wireless remote device; and
  updating the wireless remote controller device with updates through a connector of the wireless remote controller, the connector being configured to mate with the second electrical coupling of the docking assembly to receive programmatic updates of software associated with the wireless remote controller, the connector being further configured to mate with a control device to provide wireless control of video content stored in the portable digital media storage and playback device and to provide wireless control of an audio and video reproduction of the content being provided through the audio and video reproduction system communicatively coupled to the docking assembly.

54. The method of claim 53, further comprising the acts of:
  communicating an authentication signal by an authentication element of the docking assembly to another authentication element of the portable digital media storage and playback device to execute an authentication scheme at least a first time that the portable digital media storage and playback device is solely and directly connected to the docking assembly so that only the portable digital media storage and playback device and the docking assembly are directly connected together for transfer of files between the portable digital media storage and playback device and the docking assembly;
  communicating an audio signal indicative of digital media played by the portable digital media storage and playback device to an audio amplifier when the authentication scheme is successful; and
  communicating a signal indicative of digital media content stored or played by the portable digital media storage and playback device to a television-compatible second display element.

55. The method of claim 53, further comprising the act of rebroadcasting by a telephone transceiver of the docking assembly telephonic signals between the wireless remote controller device and the portable digital media storage and playback device.

* * * * *